(12) United States Patent
Shibata et al.

(10) Patent No.: US 10,063,405 B2
(45) Date of Patent: Aug. 28, 2018

(54) REAL TIME TRANSMISSION MONITORING AND ANOMALY DETECTION

(71) Applicant: HITACHI, LTD., Tokyo (JP)

(72) Inventors: Takeshi Shibata, San Jose, CA (US); Miyuki Hanaoka, San Jose, CA (US); Hiroaki Shikano, Campbell, CA (US); Prasad V. Rallapalli, Pleasanton, CA (US)

(73) Assignee: HITACHI, LTD., Tokyo (JP)

( * ) Notice: Subject to any disclaimer, the term of this patent is extended or adjusted under 35 U.S.C. 154(b) by 140 days.

(21) Appl. No.: 14/984,746

(22) Filed: Dec. 30, 2015

(65) Prior Publication Data

US 2017/0195167 A1 Jul. 6, 2017

(51) Int. Cl.
*H04L 12/24* (2006.01)
*H04L 12/939* (2013.01)

(52) U.S. Cl.
CPC ...... *H04L 41/0631* (2013.01); *H04L 41/0677* (2013.01); *H04L 49/555* (2013.01); *H04L 41/0618* (2013.01)

(58) Field of Classification Search
CPC ............. H04L 41/0631; H04L 41/0677; H04L 49/555; H04L 41/0618
See application file for complete search history.

(56) References Cited

U.S. PATENT DOCUMENTS

| | | | |
|---|---|---|---|
| 8,141,156 B1* | 3/2012 | Mao | H04L 45/021 709/223 |
| 2010/0014432 A1* | 1/2010 | Durfee | H04L 41/0631 370/242 |
| 2010/0046375 A1* | 2/2010 | Goldstein | H04L 41/0631 370/237 |
| 2010/0046378 A1* | 2/2010 | Knapp | H04L 41/0604 370/242 |
| 2013/0051248 A1* | 2/2013 | Pei | H04L 41/0677 370/245 |
| 2017/0063656 A1* | 3/2017 | Vidyarthi | H04L 43/08 |

* cited by examiner

*Primary Examiner* — Luat Phung
(74) *Attorney, Agent, or Firm* — Procopio, Cory, Hargreaves & Savitch LLP

(57) ABSTRACT

A network monitoring system compares gathered network information with path information. The comparison between gathered network information and path information provides traceability of automatic and dynamic rerouting function of network and makes it possible to understand the relation between root cause and observed problems. The combined monitoring of data plane with control plane enables identification of the original failure point where behavior is changing though routing failure is propagated around. This will allow the identification of network issues that may lead to service outages and impairments as well as alerting of issues affecting customer satisfaction, and is effective to reduce MTTD (Mean Time To Detect)/MTTR (Mean Time To Repair) and increase service availability in all markets.

12 Claims, 39 Drawing Sheets

| # | Router | Group | Source | Incoming interface | Outgoing interface | Upstream router | Flag |
|---|--------|-------|--------|-------------------|-------------------|-----------------|------|
| 1 | Router1 | ff38::1 | 2001:db8::10 | IF1 | IF2 | - | FH |
| 2 | | ff38::2 | 2001:db8::10 | IF1 | IF3 | - | FH |
| 3 | Router2 | ff38::1 | 2001:db8::10 | IF1 | IF3 | Router1 | |
| 4 | | ff38::1 | 2001:db8::10 | IF1 | IF4 | Router1 | LH |
| 5 | Router3 | ff38::2 | 2001:db8::10 | IF1 | IF4 | Router1 | LH |
| 6 | Router4 | ff38::1 | 2001:db8::10 | IF1 | IF3 | Router2 | LH |

FIG. 15

| # | Path | Group | Source | Router | Incoming interface | Outgoing interface |
|---|------|-------|--------|--------|-------------------|-------------------|
| 1 | Path1 | ff38::1 | 2001:db8::10 | Router1 | IF1 | IF2 |
| 2 | | | | Router2 | IF1 | IF3 |
| 3 | | | | | | IF4 |
| 4 | | | | Router4 | IF1 | IF3 |
| 5 | Path2 | ff38::2 | 2001:db8::10 | Router1 | IF1 | IF3 |
| 6 | | | | Router3 | IF1 | IF4 |

FIG. 16

| # | Time | Duration | Monitoring point | Source | Destination | Packet type | Packets (RX / TX) | Note |
|---|---|---|---|---|---|---|---|---|
| 1 | 01:00:01 | 00:00:01 | Router1 IF1 | 2001:db8::10 | ff38::1 | MPEG stream | 850 / 0 | |
| 2 | | | | 2001:db8::10 | ff38::2 | MPEG stream | 850 / 0 | |
| 3 | | | Router1 IF2 | 2001:db8::10 | ff38::1 | MPEG stream | 0 / 850 | |
| 4 | | | | fe80::2 | ff02::d | PIM Join | 1 / 0 | Stream info |
| 5 | | | Router1 IF3 | 2001:db8::10 | ff38::2 | MPEG stream | 0 / 850 | |
| 6 | | | | fe80::3 | ff02::d | PIM Join | 1 / 0 | Stream info |
| 7 | | | Router2 IF1 | 2001:db8::10 | ff38::1 | MPEG stream | 850 / 0 | |
| 8 | | | | fe80::2 | ff02::d | PIM Join | 0 / 1 | Stream info |
| 9 | | | Router2 IF3 | 2001:db8::10 | ff38::1 | MPEG stream | 0 / 850 | |
| 10 | | | | fe80::4 | ff02::d | PIM Join | 1 / 0 | Stream info |
| 11 | | | Router2 IF4 | 2001:db8::10 | ff38::1 | MPEG stream | 0 / 850 | |
| 12 | | | | fe80::12 | ff02::16 | MLD Report | 1 / 0 | Stream info |
| ... | | | | | | | | |
| n | 01:00:00 | 00:00:01 | Router1 IF1 | 2001:db8::10 | ff38::1 | MPEG stream | 850 / 0 | |
| n+1 | | | | 2001:db8::10 | ff38::2 | MPEG stream | 850 / 0 | |
| ... | | | | | | | | |

FIG. 17

| # | Time | Duration | Monitoring point | Source | Destination | Packet type | Packets (RX / TX) | Note |
|---|---|---|---|---|---|---|---|---|
| 1 | 01:00:01 | 00:00:01 | Router1 IF1 | 2001:db8::10 | ff38::1 | MPEG stream | 850 / 0 | |
| 2 | | | | 2001:db8::10 | ff38::2 | MPEG stream | 850 / 0 | |
| 3 | | | Router1 IF2 | 2001:db8::10 | ff38::1 | MPEG stream | 0 / 850 | |
| 4 | | | Router1 IF3 | 2001:db8::10 | ff38::2 | MPEG stream | 0 / 850 | |
| 5 | | | Router2 IF1 | 2001:db8::10 | ff38::1 | MPEG stream | 850 / 0 | |
| 6 | | | Router2 IF3 | 2001:db8::10 | ff38::1 | MPEG stream | 0 / 850 | |
| 7 | | | Router2 IF4 | 2001:db8::10 | ff38::1 | MPEG stream | 0 / 850 | |
| ... | | | | | | | | |
| n | 01:00:00 | 00:00:01 | Router1 IF1 | 2001:db8::10 | ff38::1 | MPEG stream | 850 / 0 | |
| ... | | | | | | | | |

FIG. 18

| # | Time | Duration | Monitoring point | Source | Destination | Packet type | Packets (RX / TX) | Note |
|---|---|---|---|---|---|---|---|---|
| 1 | 01:00:01 | 00:00:01 | Router1 IF2 | fe80::2 | ff02::d | PIM Join | 1 / 0 | Stream info |
| 2 | | | Router1 IF3 | fe80::3 | ff02::d | PIM Join | 1 / 0 | Stream info |
| 3 | | | Router2 IF1 | fe80::2 | ff02::d | PIM Join | 0 / 1 | Stream info |
| 4 | | | Router2 IF3 | fe80::4 | ff02::d | PIM Join | 1 / 0 | Stream info |
| 5 | | | Router2 IF4 | fe80::12 | ff02::16 | MLD Report | 1 / 0 | Stream info |
| ... | | | | | | | | |
| n | 01:00:00 | 00:00:01 | Router1 IF2 | fe80::2 | ff02::d | PIM Join | 1 / 0 | Path info |
| ... | | | | | | | | |

FIG. 19

| # | Time | Duration | Path | Monitoring segment | Packet type | Packets (In / Out) |
|---|------|----------|------|--------------------|-------------|--------------------|
| 1 | 01:00:01 | 00:00:01 | Path1 | Router1 IF1/IF2 | MPEG stream | 850 / 850 |
| 2 | | | | Router2 IF1/IF3 | MPEG stream | 850 / 850 |
| 3 | | | | Router2 IF1/IF4 | MPEG stream | 850 / 850 |
| 4 | | | | Router4 IF1/IF3 | MPEG stream | 850 / 850 |
| 5 | | | Path2 | Router1 IF1/IF3 | MPEG stream | 850 / 850 |
| 6 | | | | Router3 IF1/IF4 | MPEG stream | 850 / 850 |
| | | | | ... | | |
| n | 01:00:00 | 00:00:01 | Path1 | Router1 IF1/IF2 | MPEG stream | 850 / 850 |
| | | | | ... | | |

FIG. 20

| # | Time | Duration | Path | Monitoring segment | Packet type | Packets (In / Out) |
|---|------|----------|------|--------------------|-------------|--------------------|
| 1 | 01:00:01 | 00:00:01 | Path1 | Router1 IF2/IF1 | PIM Join | 1 / 0 |
| 2 | | | | Router2 IF3/IF1 | PIM Join | 1 / 1 |
| 3 | | | | Router2 IF4/IF1 | PIM Join | 0 / 1 |
| 4 | | | | | MLD Report | 1 / 0 |
| 5 | | | | Router4 IF3/IF1 | PIM Join | 0 / 1 |
| 6 | | | | | MLD Report | 1 / 0 |
| 7 | | | Path2 | Router1 IF3/IF1 | PIM Join | 1 / 0 |
| 8 | | | | Router3 IF4/IF1 | PIM Join | 0 / 1 |
| 9 | | | | | MLD Report | 1 / 0 |
| | | | | ... | | |
| n | 01:00:00 | 00:00:01 | Path1 | Router1 IF2/IF1 | PIM Join | 1 / 0 |
| | | | | ... | | |

FIG. 21

| | Packets with any duration | | |
|---|---|---|---|
| | In < Out | In = Out | In > Out |
| Link on a path | Anomaly | Normal | Anomaly |
| Link out of a path | N/A | N/A | N/A |

FIG. 22

| | PIM Join in 3 cycles | | | MLD Report in 2 cycles | | |
|---|---|---|---|---|---|---|
| | Join = 0 | 0 < Join < 3 | Join > 3 | Report = 0 | 0 < Report < 2 | Report > 2 |
| Link on a path | Anomaly (Error) | Anomaly (Warning) | Normal | Anomaly (Error) | Anomaly (Warning) | Normal |
| Link out of a path | N/A | N/A | N/A | N/A | N/A | N/A |

FIG. 23

| # | Time | Path | Monitoring segment | Packet type | Duration | Packets (In / Out) |
|---|---|---|---|---|---|---|
| 1 | 01:00:01 | Path1 | Router1 IF1/IF2 | MPEG stream | 00:00:01 | 850 / 850 |
| 2 | | | Router2 IF1/IF3 | MPEG stream | 00:00:01 | 850 / 850 |
| 3 | | | Router2 IF1/IF4 | MPEG stream | 00:00:01 | 850 / 850 |
| 4 | | | Router4 IF1/IF3 | MPEG stream | 00:00:01 | 850 / 850 |
| 5 | | Path2 | Router1 IF1/IF3 | MPEG stream | 00:00:01 | 850 / 850 |
| 6 | | | Router3 IF1/IF4 | MPEG stream | 00:00:01 | 850 / 850 |

FIG. 24

| # | Time | Path | Monitoring segment | Packet type | Duration | Packets (In / Out) |
|---|---|---|---|---|---|---|
| 1 | 01:00:01 | Path1 | Router1 IF2/IF1 | PIM Join | 00:03:00 | 3 / 0 |
| 2 | | | Router2 IF3/IF1 | PIM Join | 00:03:00 | 3 / 3 |
| 3 | | | Router2 IF4/IF1 | PIM Join | 00:03:00 | 0 / 3 |
| 4 | | | | MLD Report | 00:04:10 | 2 / 0 |
| 5 | | | Router4 IF3/IF1 | PIM Join | 00:03:00 | 0 / 3 |
| 6 | | | | MLD Report | 00:04:10 | 2 / 0 |
| 7 | | Path2 | Router1 IF3/IF1 | PIM Join | 00:03:00 | 3 / 0 |
| 8 | | | Router3 IF4/IF1 | PIM Join | 00:03:00 | 0 / 3 |
| 9 | | | | MLD Report | 00:04:10 | 2 / 0 |

FIG. 25

| # | Router | Group | Source | Incoming interface | Outgoing interface | Upstream router | Flag |
|---|---|---|---|---|---|---|---|
| 1 | Router1 | ff38::1 | 2001:db8::10 | IF1 | IF2 | - | FH |
| 2 | Router2 | ff38::1 | 2001:db8::10 | IF1 | IF4 | Router1 | LH |
| 3 |  | ff38::2 | 2001:db8::12 | IF4 | IF2 | - | FH |
| 4 |  | ff38::2 | 2001:db8::12 | IF4 | IF3 | - | FH |
| 5 | Router3 | ff38::2 | 2001:db8::12 | IF2 | IF4 | Router2 | LH |
| 6 | Router4 | ff38::2 | 2001:db8::12 | IF1 | IF3 | Router2 | LH |

FIG. 31

| # | Path | Group | Source | Router | Incoming interface | Outgoing interface |
|---|---|---|---|---|---|---|
| 1 | Path1 | ff38::1 | 2001:db8::10 | Router1 | IF1 | IF2 |
| 2 |  |  |  | Router2 | IF1 | IF4 |
| 3 | Path2 | ff38::2 | 2001:db8::12 | Router2 | IF4 | IF2 |
| 4 |  |  |  |  |  | IF3 |
| 5 |  |  |  | Router3 | IF2 | IF4 |
| 6 |  |  |  | Router4 | IF1 | IF3 |

FIG. 32

| # | Connecting point | In | | Out | |
|---|---|---|---|---|---|
|  |  | Group | Source | Group | Source |
| 1 | Re-transmission server | ff38::1 | 2001:db8::10 | ff38::2 | 2001:db8::12 |

FIG. 33

| # | Path | Group | Source | Router | Incoming interface | Outgoing interface |
|---|---|---|---|---|---|---|
| 1 | Path1-2 | ff38::1 | 2001:db8::10 | Router1 | IF1 | IF2 |
| 2 |  |  |  | Router2 | IF1 | IF4 |
| 3 |  | ff38::2 | 2001:db8::12 | Router2 | IF4 | IF2 |
| 4 |  |  |  |  |  | IF3 |
| 5 |  |  |  | Router3 | IF2 | IF4 |
| 6 |  |  |  | Router4 | IF1 | IF3 |

FIG. 34

| # | Time | Duration | Monitoring point | Source | Destination | Packet type | Packets (RX / TX) | Note |
|---|---|---|---|---|---|---|---|---|
| 1 | 01:00:01 | 00:00:01 | Router1 IF1 | 2001:db8::10 | ff38::1 | MPEG stream | 850 / 0 | |
| 2 | | | Router1 IF2 | 2001:db8::10 | ff38::1 | MPEG stream | 0 / 850 | |
| 3 | | | | fe80::2 | ff02::d | PIM Join | 1 / 0 | Stream1 info |
| 4 | | | Router2 IF1 | 2001:db8::10 | ff38::1 | MPEG stream | 850 / 0 | |
| 5 | | | | fe80::2 | ff02::d | PIM Join | 0 / 1 | Stream1 info |
| 6 | | | Router2 IF2 | 2001:db8::12 | ff38::2 | MPEG stream | 0 / 850 | |
| 7 | | | | fe80::3 | ff02::d | PIM Join | 1 / 0 | Stream2 info |
| 8 | | | Router2 IF3 | 2001:db8::12 | ff38::2 | MPEG stream | 0 / 850 | |
| 9 | | | | fe80::4 | ff02::d | PIM Join | 1 / 0 | Stream2 info |
| 10 | | | Router2 IF4 | 2001:db8::10 | ff38::1 | MPEG stream | 0 / 850 | |
| 11 | | | | 2001:db8::12 | ff38::2 | MPEG stream | 850 / 0 | |
| 12 | | | | fe80::12 | ff02::16 | MLD Report | 1 / 0 | Stream1 info |
| | | | | ... | | | | |
| n | 01:00:00 | 00:00:01 | Router1 IF1 | 2001:db8::10 | ff38::1 | MPEG stream | 850 / 0 | |
| | | | | ... | | | | |

FIG. 35

| # | Time | Duration | Monitoring point | Source | Destination | Packet type | Packets (RX / TX) | Note |
|---|---|---|---|---|---|---|---|---|
| 1 | 01:00:01 | 00:00:01 | Router1 IF1 | 2001:db8::10 | ff38::1 | MPEG stream | 850 / 0 | |
| 2 | | | Router1 IF2 | 2001:db8::10 | ff38::1 | MPEG stream | 0 / 850 | |
| 3 | | | Router2 IF1 | 2001:db8::10 | ff38::1 | MPEG stream | 850 / 0 | |
| 4 | | | Router2 IF2 | 2001:db8::12 | ff38::2 | MPEG stream | 0 / 850 | |
| 5 | | | Router2 IF3 | 2001:db8::12 | ff38::2 | MPEG stream | 0 / 850 | |
| 6 | | | Router2 IF4 | 2001:db8::10 | ff38::1 | MPEG stream | 0 / 850 | |
| 7 | | | | 2001:db8::12 | ff38::2 | MPEG stream | 850 / 0 | |
| | | | | ... | | | | |
| n | 01:00:00 | 00:00:01 | Router1 IF1 | 2001:db8::10 | ff38::1 | MPEG stream | 850 / 0 | |
| | | | | ... | | | | |

FIG. 36

| # | Router | Destination | Nexthop router | Outgoing interface | Flag |
|---|--------|-------------|----------------|--------------------|------|
| 1 | Router1 | 2001:db8::2 | Rotuer2 | IF2 | C |
| 2 | | 2001:db8::3 | Router3 | IF3 | C |
| 3 | | 2001:db8::4 | Router2 | IF2 | |
| 4 | | 2001:db8::10 | - | IF1 | C |
| 5 | | 2001:db8::11 | Router2 | IF2 | |
| 6 | | 2001:db8::12 | Router2 | IF2 | |
| 7 | | 2001:db8::13 | Router3 | IF3 | |
| 8 | Router2 | 2001:db8::1 | Router1 | IF1 | C |
| 9 | | 2001:db8::3 | Router3 | IF2 | C |
| 10 | | 2001:db8::4 | Router4 | IF3 | C |
| 11 | | 2001:db8::10 | Router1 | IF1 | |
| 12 | | 2001:db8::11 | Router4 | IF3 | |
| 13 | | 2001:db8::12 | - | IF4 | C |
| 14 | | 2001:db8::13 | Router3 | IF2 | |
| 15 | Router3 | 2001:db8::1 | Router1 | IF2 | C |
| 16 | | 2001:db8::2 | Router2 | IF2 | C |
| 17 | | 2001:db8::4 | Router4 | IF3 | C |
| 18 | | 2001:db8::10 | Router1 | IF1 | |
| 19 | | 2001:db8::11 | Router4 | IF3 | |
| 20 | | 2001:db8::12 | Router2 | IF2 | |
| 21 | | 2001:db8::13 | - | IF4 | C |
| 22 | Router4 | 2001:db8::1 | Router2 | IF1 | |
| 23 | | 2001:db8::2 | Router2 | IF1 | C |
| 24 | | 2001:db8::3 | Router3 | IF2 | C |
| 25 | | 2001:db8::10 | Router2 | IF1 | |
| 26 | | 2001:db8::11 | - | IF3 | C |
| 27 | | 2001:db8::12 | Router2 | IF1 | |
| 28 | | 2001:db8::13 | Router3 | IF2 | |

FIG. 42

| # | Time | Duration | Monitoring point | Source | Destination | Packet type | Packets (RX / TX) | Note |
|---|------|----------|------------------|--------|-------------|-------------|-------------------|------|
| 1 | 01:00:01 | 00:00:01 | Router1 IF1 | 2001:db8::10 | 2001:db8::11 | MPEG stream | 850 / 0 | |
| 2 | | | | 2001:db8::10 | 2001:db8::12 | Service reply | 1 / 0 | Stream info |
| 3 | | | | 2001:db8::12 | 2001:db8::10 | Service request | 0 / 1 | Stream info |
| 4 | | | Router1 IF2 | 2001:db8::10 | 2001:db8::11 | MPEG stream | 0 / 850 | |
| 5 | | | | 2001:db8::10 | 2001:db8::12 | Service reply | 0 / 1 | Stream info |
| 6 | | | | 2001:db8::12 | 2001:db8::10 | Service request | 1 / 0 | Stream info |
| 7 | | | Router2 IF1 | 2001:db8::10 | 2001:db8::11 | MPEG stream | 850 / 0 | |
| 8 | | | | 2001:db8::10 | 2001:db8::12 | Service reply | 1 / 0 | Stream info |
| 9 | | | | 2001:db8::12 | 2001:db8::10 | Service request | 0 / 1 | Stream info |
| 10 | | | Router2 IF3 | 2001:db8::10 | 2001:db8::11 | MPEG stream | 0 / 850 | |
| 11 | | | | 2001:db8::11 | 2001:db8::12 | Session request | 1 / 0 | Stream info |
| 12 | | | | 2001:db8::12 | 2001:db8::11 | Session reply | 0 / 1 | Stream info |
| 13 | | | Router2 IF4 | 2001:db8::10 | 2001:db8::12 | Service reply | 0 / 1 | Stream info |
| 14 | | | | 2001:db8::11 | 2001:db8::12 | Session request | 0 / 1 | Stream info |
| 15 | | | | 2001:db8::12 | 2001:db8::10 | Service request | 1 / 0 | Stream info |
| 16 | | | | 2001:db8::12 | 2001:db8::11 | Session reply | 1 / 0 | Stream info |
| | ... | | | | | | | |
| n | 01:00:00 | 00:00:01 | Router1 IF1 | 2001:db8::10 | 2001:db8::11 | MPEG stream | 850 / 0 | |
| | ... | | | | | | | |

FIG. 43

| # | Service | Source | Destination | Related server |
|---|---------|--------|-------------|----------------|
| 1 | Service1 | 2001:db8::10 | 2001:db8::11 | 2001:db8::12 |
| | | | | |

FIG. 44

| # | Path | Plane | Source | Destination | Router | Incoming interface | Outgoing interface |
|---|------|-------|--------|-------------|--------|--------------------|--------------------|
| 1 | Path1 | Data | 2001:db8::10 | 2001:db8::11 | Router1 | IF1 | IF2 |
| 2 | | | | | Router2 | IF1 | IF3 |
| 3 | | | | | Router4 | IF1 | IF3 |
| 4 | | Control | 2001:db8::11 | 2001:db8::12 | Router2 | IF3 | IF4 |
| 5 | | | | | Router4 | IF3 | IF1 |
| 6 | | | 2001:db8::12 | 2001:db8::10 | Router1 | IF2 | IF1 |
| 7 | | | | | Router2 | IF4 | IF1 |

FIG. 45

| # | Equipment | Destination | Nexthop equipment | Outgoing interface | Flag |
|---|---|---|---|---|---|
| 1 | Router2 | 2001:db8::1 | S/P GW | IF1 | C |
| 2 |  | 2001:db8::3 | MME | IF2 | C |
| 3 |  | 2001:db8::4 | eNB | IF3 | C |
| 4 | S/P GW | 2001:db8::2 | Router2 | IF2 | C |
| 5 |  | 2001:db8::3 | Router2 | IF2 |  |
| 6 |  | 2001:db8::4 | Router2 | IF2 |  |
| 7 |  | 2001:db8::10 | - | IF1 | C |
| 8 |  | 2001:db8::11 | eNB | IF2 | T |
| 9 |  | 2001:db8::12 | eNB | IF2 | T |
| 10 |  | 2001:db8::13 | eNB | IF2 | T |
| 11 | MME | 2001:db8::1 | Router2 | IF2 |  |
| 12 |  | 2001:db8::2 | Router2 | IF2 | C |
| 13 |  | 2001:db8::4 | Router2 | IF2 |  |
| 14 | eNB | 2001:db8::1 | Router2 | IF1 |  |
| 15 |  | 2001:db8::2 | Router2 | IF1 | C |
| 16 |  | 2001:db8::3 | Router2 | IF1 |  |
| 17 |  | 2001:db8::10 | S/P GW | IF1 | T |
| 18 |  | 2001:db8::11 | - | IF3 | C |
| 19 |  | 2001:db8::12 | - | IF3 | C |
| 20 |  | 2001:db8::13 | - | IF3 | C |

FIG. 52

| # | Time | Duration | Monitoring point | Source | Destination | Packet type | Packets (RX / TX) | Note |
|---|---|---|---|---|---|---|---|---|
| 1 | 01:00:01 | 00:00:01 | S/P GW IF1 | 2001:db8::10 | 2001:db8::11 | MPEG stream | 850 / 0 |  |
| 2 |  |  |  | 2001:db8::11 | 2001:db8::10 | Service request | 0 / 1 | Stream info |
| 3 |  |  | S/P GW IF2 | 2001:db8::1 | 2001:db8::3 | Session reply | 0 / 1 | Stream info |
| 4 |  |  |  | 2001:db8::1* | 2001:db8::4* | MPEG stream | 0 / 850 |  |
| 5 |  |  |  | 2001:db8::3 | 2001:db8::1 | Session request | 1 / 0 | Stream info |
| 6 |  |  |  | 2001:db8::4* | 2001:db8::1* | Service request | 1 / 0 | Stream info |
| 7 |  |  | Router2 IF1 | 2001:db8::1 | 2001:db8::3 | Session reply | 1 / 0 | Stream info |
| 8 |  |  |  | 2001:db8::1* | 2001:db8::4* | MPEG stream | 850 / 0 |  |
| 9 |  |  |  | 2001:db8::3 | 2001:db8::1 | Session request | 0 / 1 | Stream info |
| 10 |  |  |  | 2001:db8::4* | 2001:db8::1 | Service request* | 0 / 1 | Stream info |
| 11 |  |  | Rotuer2 IF2 | 2001:db8::1 | 2001:db8::3 | Session reply | 0 / 1 | Stream info |
| 12 |  |  |  | 2001:db8::3 | 2001:db8::1 | Session request | 1 / 0 | Stream info |
| 13 |  |  |  | 2001:db8::3 | 2001:db8::4 | Connection reply | 1 / 0 | Stream info |
| 14 |  |  |  | 2001:db8::4 | 2001:db8::3 | Connection request | 0 / 1 | Stream info |
| 15 |  |  | Router2 IF3 | 2001:db8::1* | 2001:db8::4* | MPEG stream | 0 / 850 |  |
| 16 |  |  |  | 2001:db8::3 | 2001:db8::4 | Connection reply | 0 / 1 | Stream info |
| 17 |  |  |  | 2001:db8::4 | 2001:db8::3 | Connection request | 1 / 0 | Stream info |
| 18 |  |  |  | 2001:db8::4* | 2001:db8::1* | Service request | 1 / 0 | Stream info |
| 19 |  |  | eNB IF1 | 2001:db8::1* | 2001:db8::4* | MPEG stream | 850 / 0 |  |
| 20 |  |  |  | 2001:db8::3 | 2001:db8::4 | Connection reply | 1 / 0 | Stream info |
| 21 |  |  |  | 2001:db8::4* | 2001:db8::1* | Service request | 0 / 1 | Stream info |
| 22 |  |  |  | 2001:db8::4 | 2001:db8::3 | Connection request | 0 / 1 | Stream info |
| 23 |  |  | eNB IF3 | 2001:db8::10 | 2001:db8::11 | MPEG stream | 0 / 850 |  |
| 24 |  |  |  | 2001:db8::11 | 2001:db8::10 | Service request | 1 / 0 | Stream info |
| 25 |  |  |  | fe80::4 | fe80::11 | Connection reply | 0 / 1 | Stream info |
| 26 |  |  |  | fe80::11 | fe80::4 | Connection request | 1 / 0 | Stream info |
|  |  |  |  | ... |  |  |  |  |
| n | 01:00:00 | 00:00:01 | S/P GW IF1 | 2001:db8::10 | 2001:db8::11 | MPEG stream | 850 / 0 |  |
|  |  |  |  | ... |  |  |  |  |

FIG. 53

| # | Service | Source | Destination | Related equipment |
|---|---------|--------|-------------|-------------------|
| 1 | Service1 | 2001:db8::10 | 2001:db8::11 | 2001:db8::1, 2001:db8::3, 2001:db8::4 |
| | | | | |

FIG. 54

| # | Path | Plane | Source | Destination | Equipment | Incoming interface | Outgoing interface |
|---|------|-------|--------|-------------|-----------|--------------------|--------------------|
| 1 | Path1 | Data | 2001:db8::10 | 2001:db8::11 | S/P GW | IF1 | IF2 |
| 2 | | | (2001:db8::1*) | (2001:db8::4*) | Router2 | IF1 | IF3 |
| 3 | | | | | eNB | IF1 | IF3 |
| 4 | | Control | 2001:db8::3 | 2001:db8::1 | S/P GW | IF2 | - |
| 5 | | | | | Router2 | IF2 | IF1 |
| 6 | | | | | MME | - | IF2 |
| 7 | | | 2001:db8::4 | 2001:db8::3 | MME | IF2 | - |
| 8 | | | | | Router2 | IF3 | IF2 |
| 9 | | | | | eNB | - | IF1 |
| 10 | | | 2001:db8::11 | 2001:db8::10 | S/P GW | IF2 | IF1 |
| 11 | | | (2001:db8::4*) | (2001:db8::1*) | Router2 | IF3 | IF1 |
| 12 | | | | | eNB | IF3 | IF1 |

FIG. 55

| # | Time | Duration | Monitoring Point | Source | Destination | Packet type | Packets (RX / TX) | Note |
|---|------|----------|------------------|--------|-------------|-------------|-------------------|------|
| 1 | 01:00:01 | 00:00:01 | S/P GW IF1 | 2001:db8::10 | 2001:db8::11 | MPEG stream | 850 / 0 | |
| 2 | | | S/P GW IF2 | 2001:db8::1* | 2001:db8::4* | MPEG stream | 0 / 850 | |
| 3 | | | Router2 IF1 | 2001:db8::1* | 2001:db8::4* | MPEG stream | 850 / 0 | |
| 4 | | | Router2 IF3 | 2001:db8::1* | 2001:db8::4* | MPEG stream | 0 / 850 | |
| 5 | | | eNB IF1 | 2001:db8::1* | 2001:db8::4* | MPEG stream | 850 / 0 | |
| 6 | | | eNB IF3 | 2001:db8::10 | 2001:db8::11 | MPEG stream | 0 / 850 | |
| | | | ... | | | | | |
| n | 01:00:00 | 00:00:01 | S/P GW IF1 | 2001:db8::10 | 2001:db8::11 | MPEG stream | 850 / 0 | |
| | | | ... | | | | | |

FIG. 56

REAL TIME TRANSMISSION MONITORING AND ANOMALY DETECTION

BACKGROUND

Field

The present disclosure is generally directed to network monitoring systems, and more specifically, to anomaly detection and real time transmission monitoring.

Related Art

FIG. 1 illustrates a related art network monitoring system 100 gathering network information. The network monitoring system can include one or more routers 200a, 200b, 200c, 200d configured to provide data to a user data statistics collection module 21. Such data can include the number of packets and octets from routers via SNMP (Simple Network Management Protocol) MIB (Management Information Base), sFlow, NetFlow and so on. User data statistics collection module 21 feeds into user data anomaly monitoring module 22 configured to monitor the data statistics for anomalies. Detected anomalies are sent to the user terminal 10.

FIG. 2 illustrates a related art network monitoring system gathering network packets from taps. This system calculates the network information such as latency and jitter as well as the number of packets and octets from collected packets. In this example, there are one or more taps 300a, 300b, 300c, 300d, 300e, and 300f providing the network information to a packet analyzing module 31, which can conduct packet analysis and feed the packet analysis to the user data statistics collection module 32, and user data anomaly monitoring module 33. The above network monitoring systems make a judgment on network anomaly by observing the change of the monitored network information.

SUMMARY

Aspects of the present disclosure include a management computer configured to manage a network. The management computer may involve a memory, configured to store anomaly criteria information for the network and path information for the network; and a processor, configured to apply the path information to at least one of data plane packet information and control plane packet information to generate matching information, the matching information comprising first entries from at least one of the data plane packet information and control plane packet information having sources matched to corresponding second entries from the path information having paths corresponding to the sources; and monitor the network for an anomaly based on the matching information and the anomaly criteria information.

Aspects of the present disclosure further include a method for managing a network, which can involve managing anomaly criteria information for the network and path information for the network; applying the path information to at least one of data plane packet information and control plane packet information to generate matching information, the matching information comprising first entries from at least one of the data plane packet information and control plane packet information having sources matched to corresponding second entries from the path information having paths corresponding to the sources; and monitoring the network for an anomaly based on the matching information and the anomaly criteria information.

Aspects of the present disclosure further include a non-transitory computer readable medium storing instructions for managing a network. The instructions can involve managing anomaly criteria information for the network and path information for the network; applying the path information to at least one of data plane packet information and control plane packet information to generate matching information, the matching information comprising first entries from at least one of the data plane packet information and control plane packet information having sources matched to corresponding second entries from the path information having paths corresponding to the sources; and monitoring the network for an anomaly based on the matching information and the anomaly criteria information.

BRIEF DESCRIPTION OF DRAWINGS

FIG. 15 illustrates an integrated multicast routing table, in accordance with an example implementation.

FIG. 16 illustrates the path information table, in accordance with an example implementation.

FIG. 17 illustrates an analyzed packet information table, in accordance with an example implementation.

FIG. 18 illustrates a data plane packet information table, in accordance with an example implementation.

FIG. 19 illustrates the control plane packet information table, in accordance with an example implementation.

FIG. 20 illustrates the data plane and path matching table, in accordance with an example implementation.

FIG. 21 illustrates a control plane and path matching table, in accordance with an example implementation.

FIG. 22 illustrates an example of anomaly criteria for data plane, in accordance with an example implementation.

FIG. 23 illustrates an example of anomaly criteria for control plane, in accordance with an example implementation.

FIG. 24 illustrates a data plane anomaly monitoring table, in accordance with an example implementation.

FIG. 25 illustrates a control plane anomaly monitoring table, in accordance with an example implementation.

FIGS. 31 to 34 illustrate path and routing tables, in accordance with an example implementation.

FIG. 35 illustrates an analyzed packet information table, in accordance with an example implementation.

FIG. 36 illustrates the data plane packet information table, in accordance with an example implementation.

FIG. 42 illustrates an integrated unicast routing table, in accordance with an example implementation.

FIG. 43 illustrates an analyzed packet information table for unicast, in accordance with an example implementation.

FIG. 44 illustrates target path information table generated at target path block for unicast, in accordance with an example implementation.

FIG. 45 illustrates a path information table, in accordance with an example implementation.

FIG. 52 illustrates an integrated unicast routing table about the network topology, in accordance with an example implementation.

FIG. 53 illustrates an analyzed packet information table, in accordance with an example implementation.

FIG. 54 illustrates a target path information table, in accordance with an example implementation.

FIG. 55 illustrates a path information table for mobile service, in accordance with an example implementation.

FIG. 56 illustrates a data plane packet information table for mobile service, in accordance with an example implementation.

DETAILED DESCRIPTION

Figure 1:
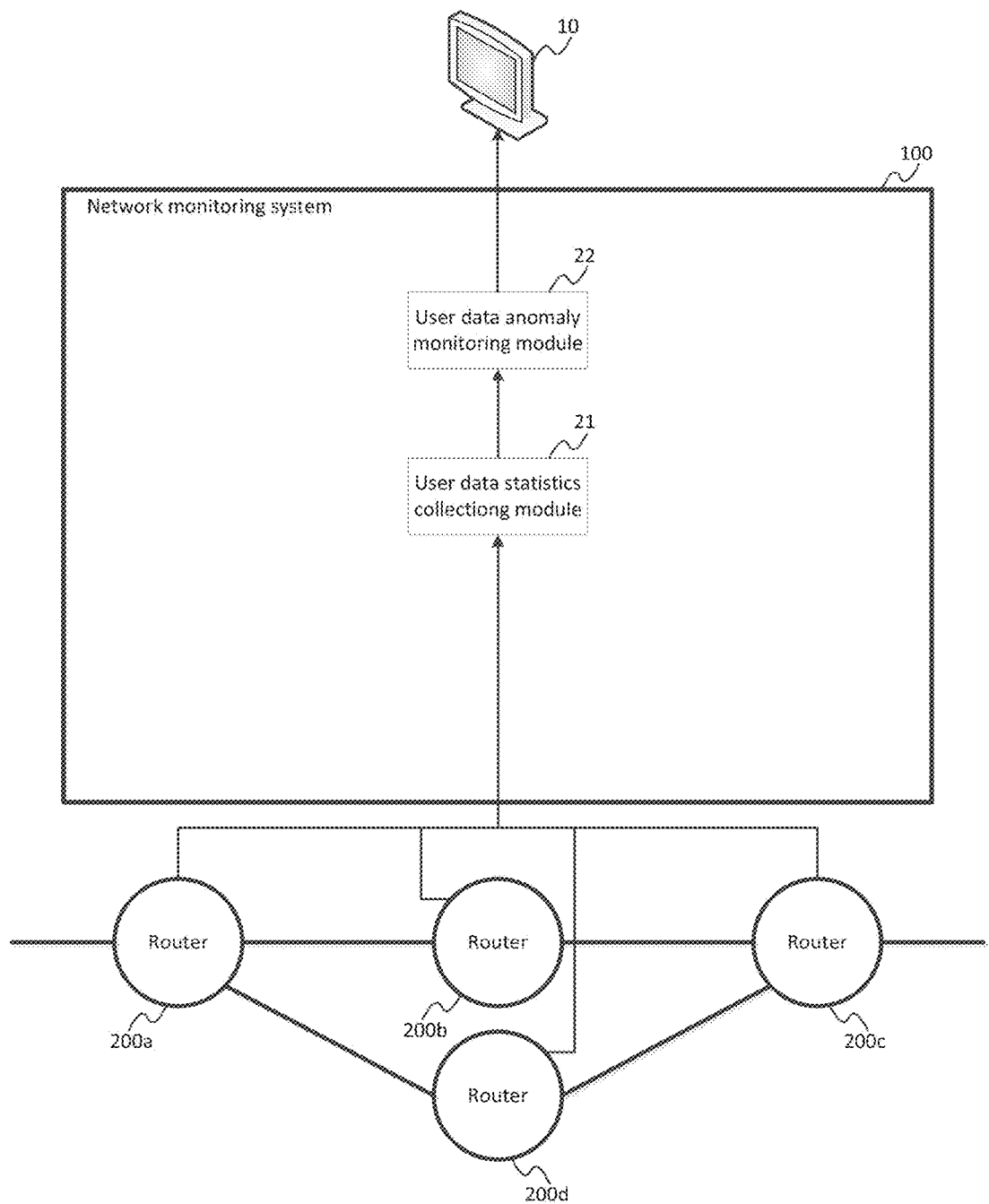
FIG. 1 illustrates a related art network monitoring system gathering network information.
Figure 2:
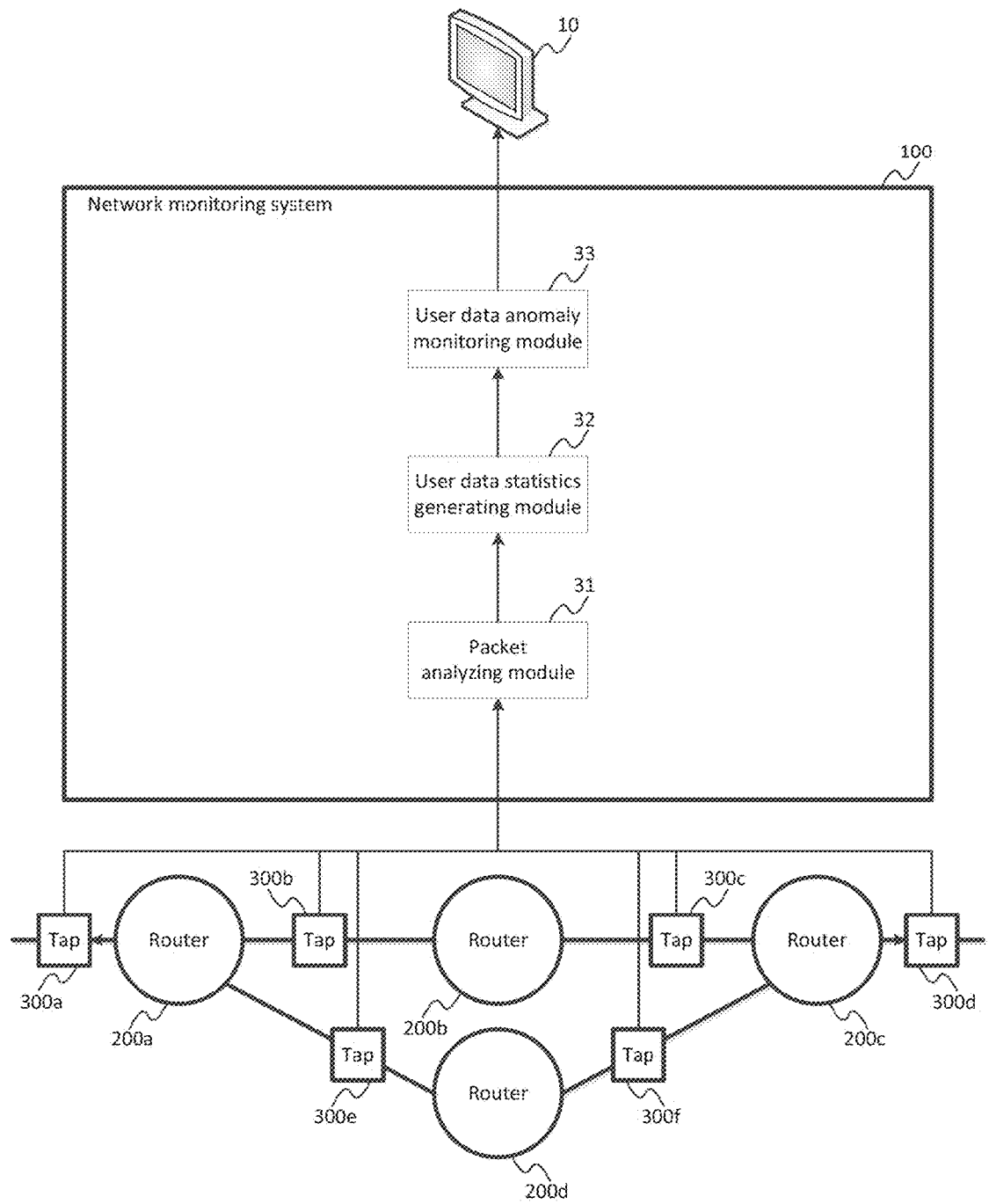
FIG. 2 illustrates a related art network monitoring system gathering network packets from taps.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In related art network system implementations, transmission path routes automatically and dynamically changing by the reasons such as network failure, traffic congestion, etc. and a data transmission of network service keeps appropriate state. A network transmission is continuously provided without problem in the case that automatic and dynamic rerouting function works correctly if network failure occurred. This automatic and dynamic rerouting function makes it difficult to understand the relation between root cause and observed problems.

Figure 3:
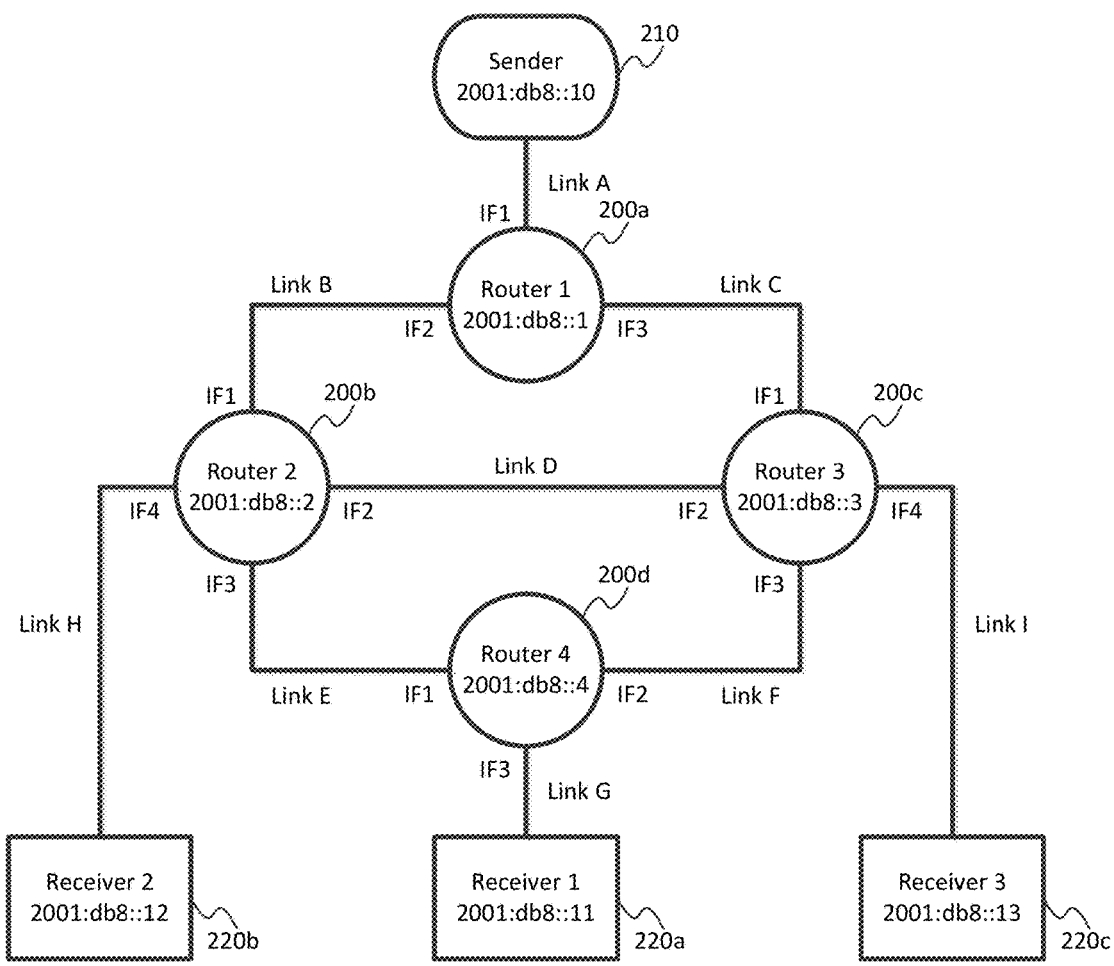
FIG. 3 illustrates an example network.
Figure 4:
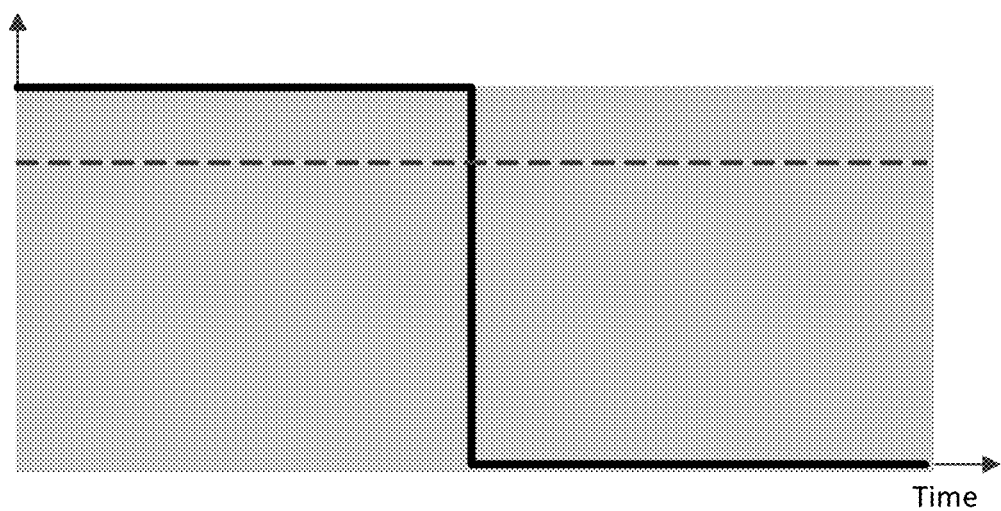
FIG. 4 illustrates an example sample utilization for the example network of FIG. 3.

FIG. 3 illustrates an example network with sender 210, receivers 220a, 220b, 220c, and various links. In the example of FIG. 3, if a failure occurs on the link B, the utilization of link B will be as illustrated in FIG. 4. In the example of FIG. 3, there are several devices such as routers 200a, 200b, 200c, 200d that transmits IP (Internet Protocol) packets based on routing table, sender 210 that sends IP service data and receiver 220 that receives IP service data from sender. Each device has its own device number, and global and link local IP addresses based on the device number, e.g. router 1 at 200a has device number "1", global IP address "2001:db8::1" and link local IP address "fe80::1" on IF1, IF2 and IF3. In the case that a failure occurred on the link B, the utilization of link B is changed like FIG. 4. In the related monitoring system, this change is detected as the anomaly that needs immediate recovery. However, if the original route e.g. Link A-B-E-G is rerouted to A-C-F-G and the data is transmitted continuously, immediate recovery is needless. In the related art monitoring systems, the change as illustrated in FIG. 4 is detected as the anomaly that needs immediate recovery. However, if the original route in FIG. 3 such as A-B-E-G is rerouted to A-C-F-G and the data is transmitted continuously, immediate recovery is not necessary.

Figure 5:
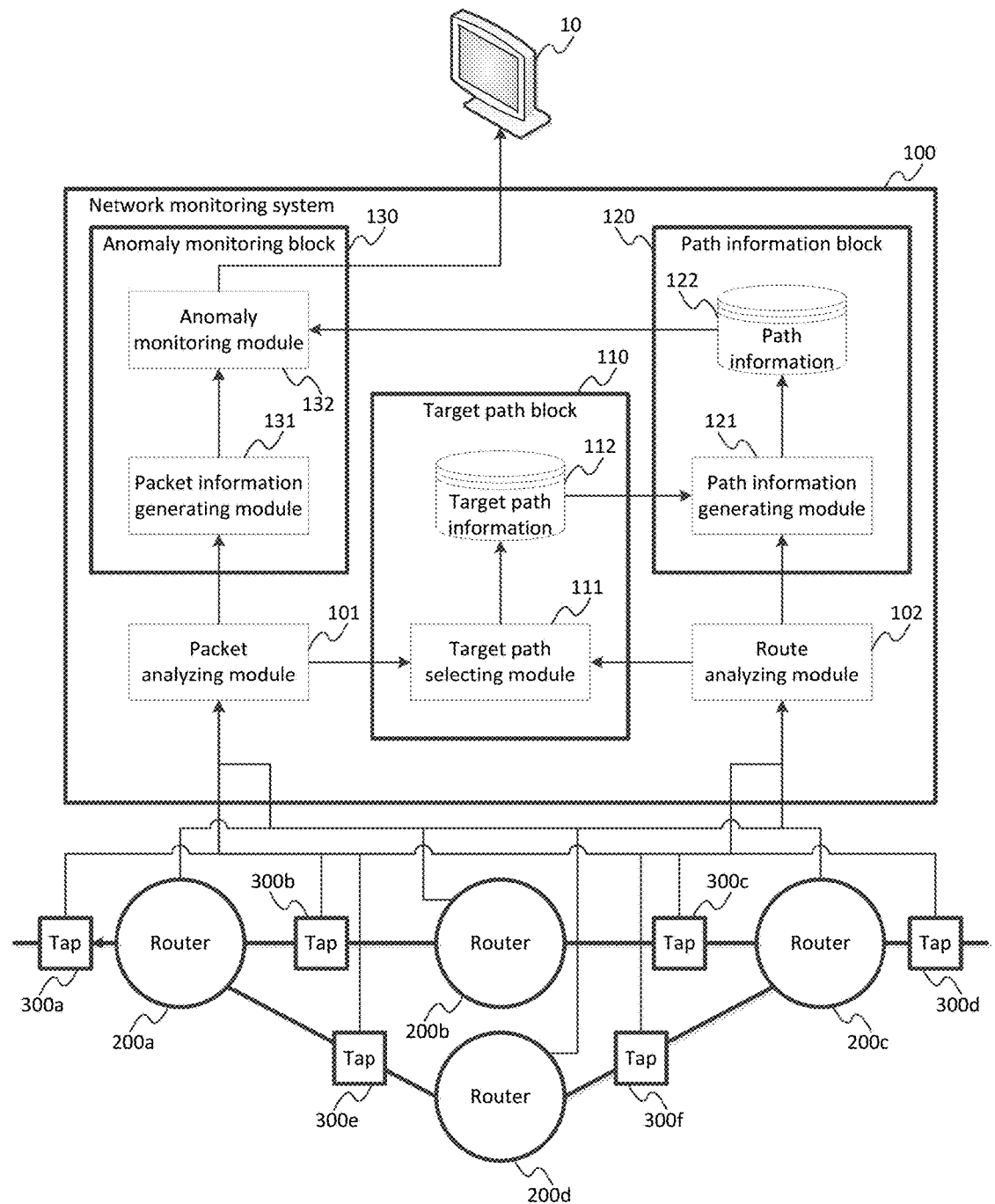
FIG. 5 illustrates a network monitoring system, in accordance with an example implementation.

FIG. 5 illustrates a network monitoring system 100, in accordance with an example implementation. In the network monitoring system 100, there is target path block 110, path information block 120, and anomaly monitoring block 130. Target path block 110 selects the target paths those are maintained as the path information for anomaly monitoring, and includes target path selecting module 111 and target path information 112. This selection can be made based on the analyzed packets come from packet analyzing module 101 and/or based on the analyzed routers come from route analyzing module 102. Path information block 120 maintains the path information of the target paths specified by the target path block 110, and includes path information generating module 121 and path information 122. Anomaly monitoring block 130 monitors anomaly by comparing packet information with path information, and includes packet information generating module 131 and anomaly modeling module 132.

The analyzed packets created at packet analyzing module 101 are normally generated based on the packets gathered from taps but also be able to generated from the SNMP MIB, sFlow, NetFlow, etc. gathered from routers. The analyzed routes created at route analyzing module 102 are normally generated based on the routes gathered from routers but also be able to generated from the packets related to routing such as IS-IS (Intermediate System to Intermediate System), PIM (Protocol Independent Multicast), etc. gathered from taps.

The comparison between packet information and path information at anomaly monitoring block 130 provides traceability of automatic and dynamic rerouting function of network and makes it possible to understand the relation between root cause and observed problems. In FIG. 5, there is a tap on each link. By comparing the information from two taps beside a router e.g. tap 300a and tap 300b, the difference between incoming and outgoing the router can be monitored. In example implementations, taps may be applied at both ends of each link. For example, there can be two taps on each link, and by comparing the information from two taps on the same link, the difference occurring inside the link, e.g. originated in fiber, optical transport system, etc., also can be monitored.

Figure 6:
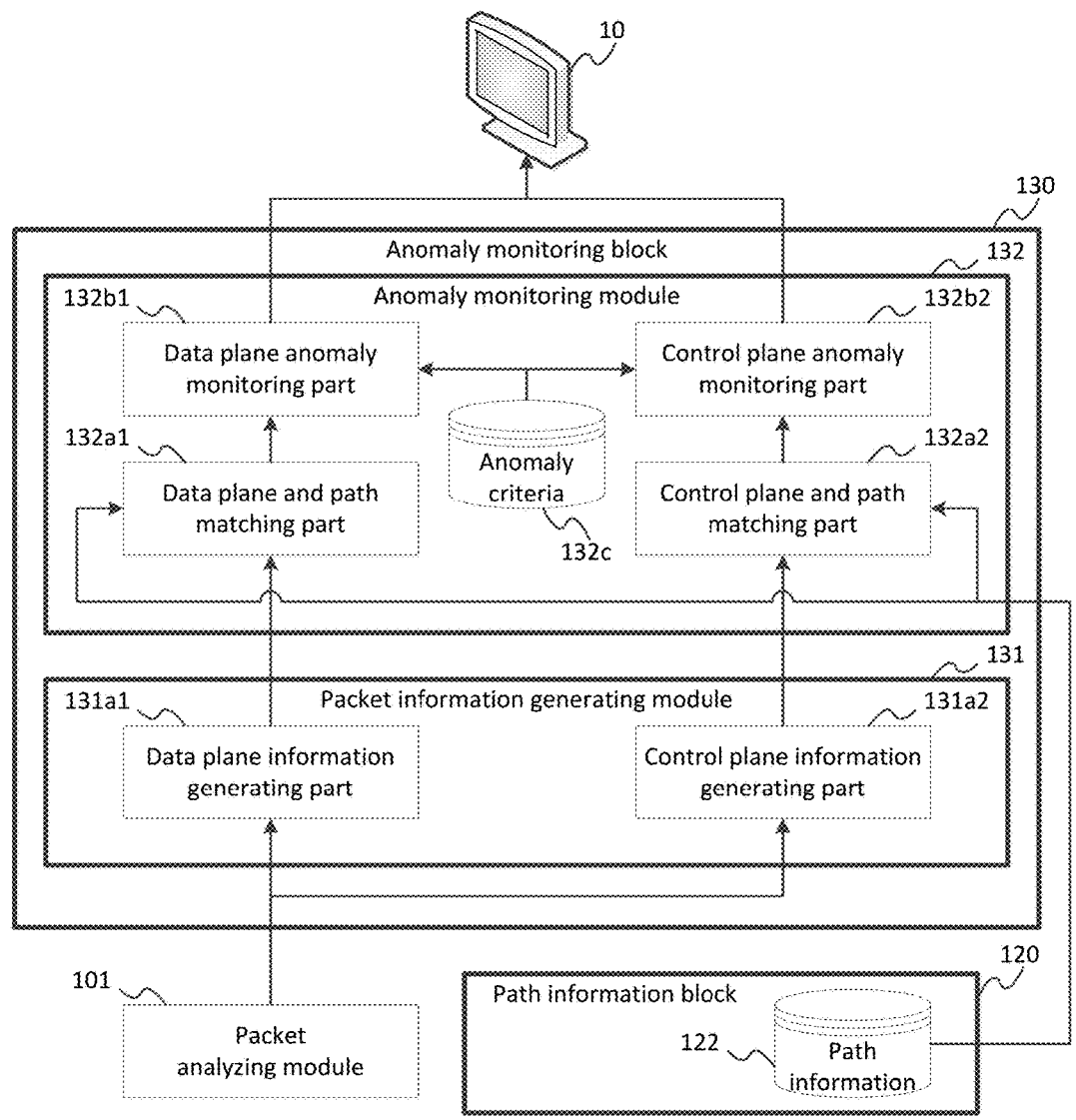
FIG. 6 illustrates an anomaly monitoring block, in accordance with an example implementation

FIG. 6 illustrates an anomaly monitoring block 130, in accordance with an example implementation. There are two types of packets; one is data plane information such as video data, voice data, etc., the other is control plane information such as service request, routing protocol, and so on. Each of data/control plane information generating part 131a1, 131a2 gathers packet information analyzed at the packet analyzing module 101 on each capturing time to generate information of specified duration for anomaly monitoring. Each of data/control plane and path matching part 132a1, 132a2 constructs information along path input from path information block, and each of data/control plane anomaly monitoring part 132b1, 132b2 detects and/or identifies anomaly based on those information and anomaly criteria 132c. Details are provided for each of the following examples.

Figure 7A:
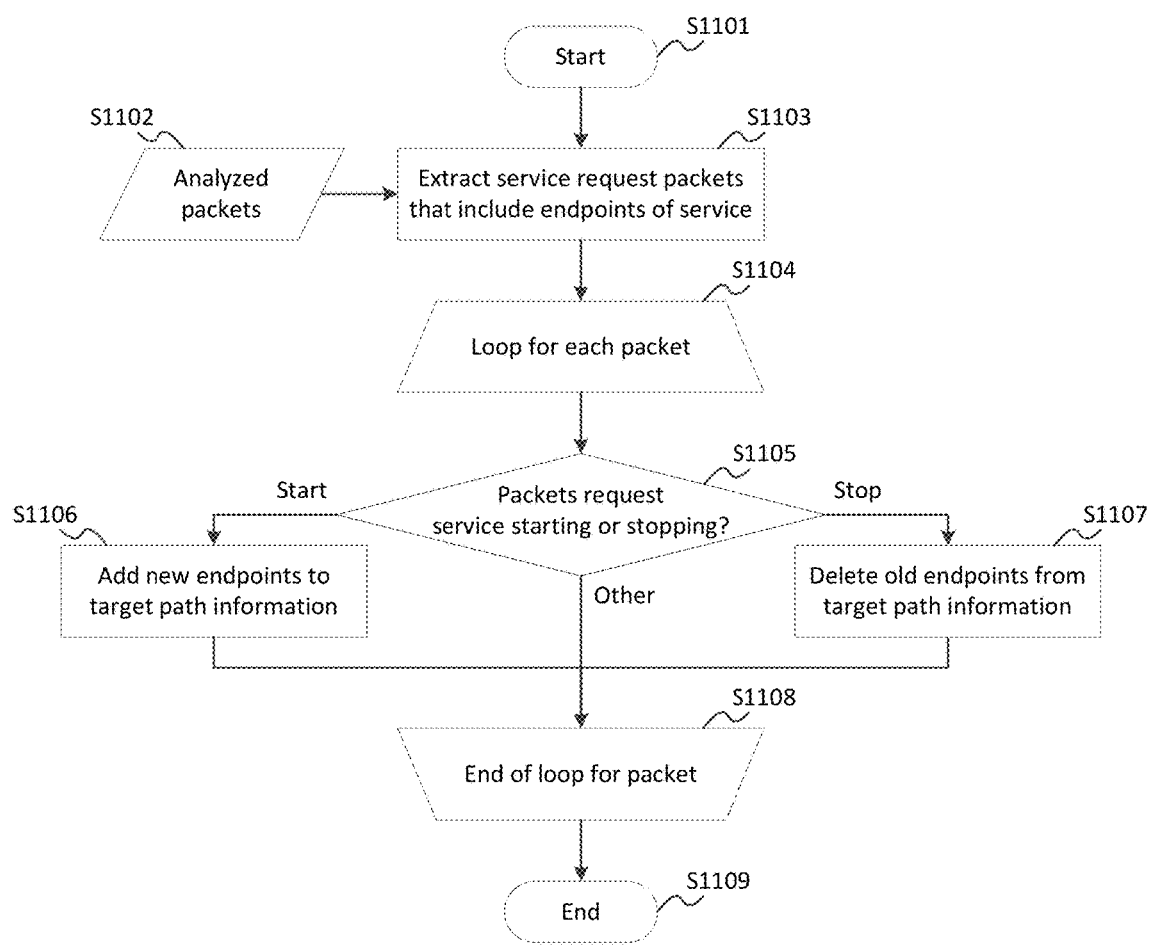
FIGS. 7(a) and 7(b) illustrate flow diagrams of target path selection based on packet information and path information, in accordance with an example implementation.

FIG. 7(a) illustrates flow diagram of target path selection based on packet information, in accordance with an example implementation. The flow can be executed by target path selecting module 111 and starts at S1101, wherein analyzed packets are processed at S1102. At S1103, the flow extracts service request packets that include endpoints of service, and a loop is initiated at S1104. At S1105, a check is performed as to whether the packets request the starting or stopping of service. If the packets are requesting the starting of service, then the flow proceeds to S1106 to add new endpoints to target path information, otherwise the flow proceeds to S1107 to delete old endpoints from target path information. If no such information is provided (Other), the flow proceeds to S1108 to end the loop for the packet. Thus in the example of FIG. 7(a), if a service requires a service request when the service starts e.g. SIP (Session Initiating Protocol) request, both the source IP address and the destination IP address specifying the starting service are found in analyzed packets including those service request packets.

Figure 7B:
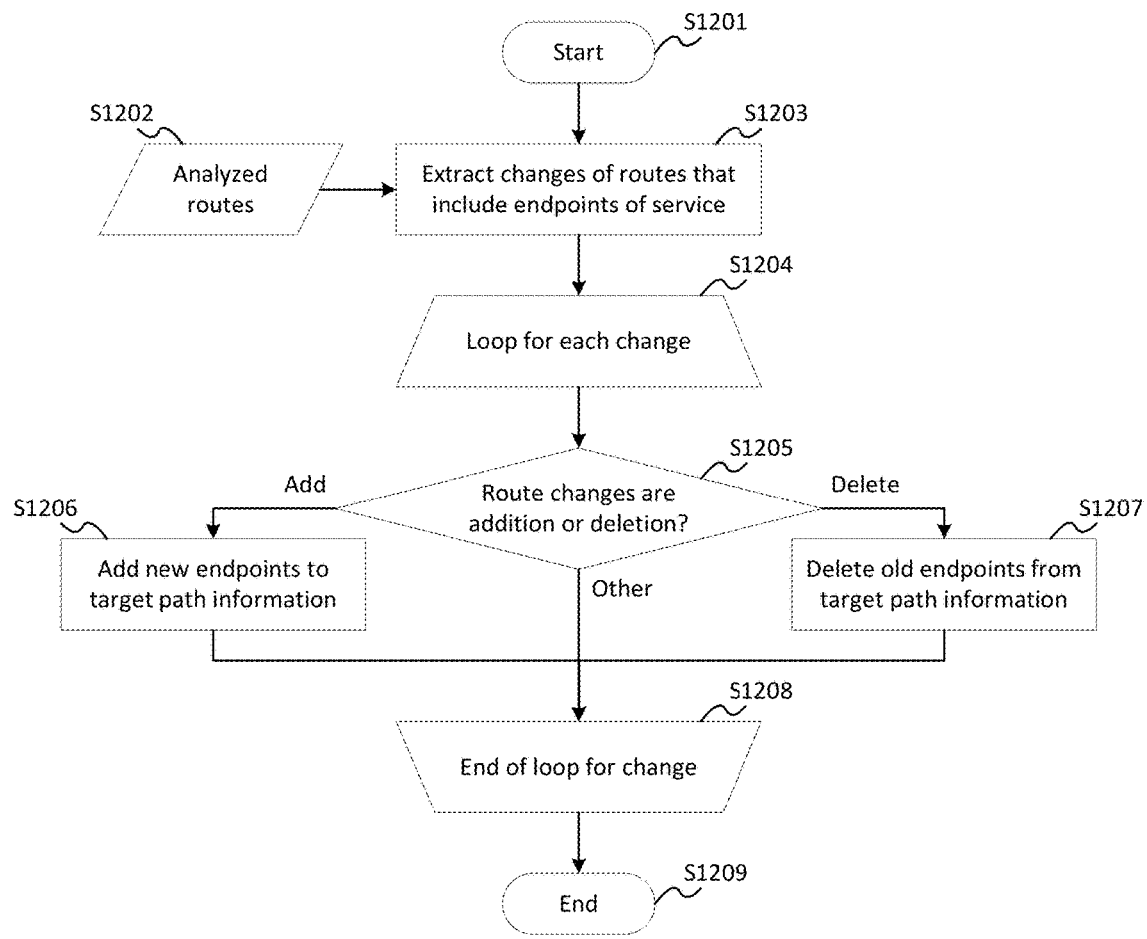

The flow of FIG. 7(a) can be similarly modified for target path selection based on path information as illustrated in FIG. 7(b). For example, if a service creates path for service when the service starts e.g. MLD (Multicast Listener Discovery) Report, both the source IP address and the destination IP address those specifies the starting service are found in analyzed route as a path change. In such a modification, the route changes that include the endpoint address are extracted, and the changes are analyzed to determine if they are an addition or deletion. For addition operations, new endpoints are added to the target path information. For deletion operations, old endpoints are deleted from the target path information. The flow can be executed by target path selecting module 111 and starts at S1201, wherein analyzed routes are processed at S1202. At S1203, the flow extracts route changes that include endpoints of service, and a loop is initiated at S1204. At S1205, a check is performed as to whether the route changes are addition or deletions of endpoints of service. If the route change is an addition, then the flow proceeds to S1206 to add new endpoints to target path information, otherwise the flow proceeds to S1207 to delete old endpoints from target path information for a deletion. If no such information is provided (Other), the flow proceeds to S1208 to end the loop for the change.

Figure 8:
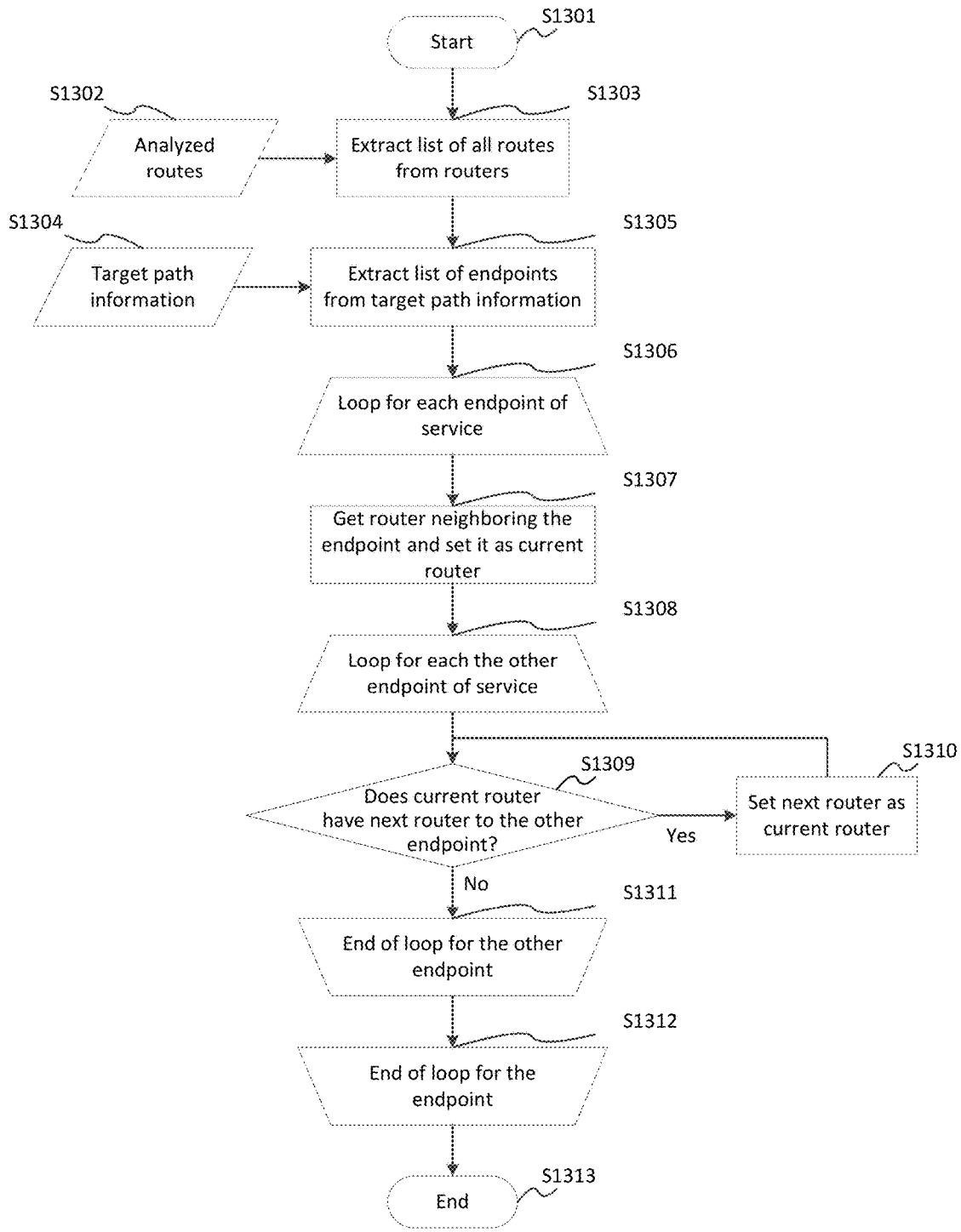
FIG. 8 illustrates a flow diagram for path information generation, in accordance with an example implementation.

FIG. 8 illustrates a flow diagram for path information generation, in accordance with an example implementation. Analyzed routes e.g. routing table is obtained from each router and those information are listed together. The flow starts at S1301, wherein analyzed routes S1302 and target path information S1304 are processed. At S1303, the flow extracts the list of all routes from routers. At S1305, the flow extracts list of endpoints from target path information. At S1306 a loop is initiated for each endpoint of service. For each iteration of the loop, the flow obtains the router neighboring the endpoint and set it as the current router at S1307. At S1308, the flow initiates a loop for each of the other endpoints of service. During the loop, a check is performed as to whether the current router has a next router to the other endpoint at S1309. If so (Yes), the flow proceeds to S1310 to set the next router as the current router. If not (No), the flow proceeds to S1311 to end the loop for the other endpoint. At S1312, when each of the other endpoints of service is processed, the loop for the endpoint is terminated. When all of the endpoints are iterated, then the flow terminates at S1313.

Figure 9:
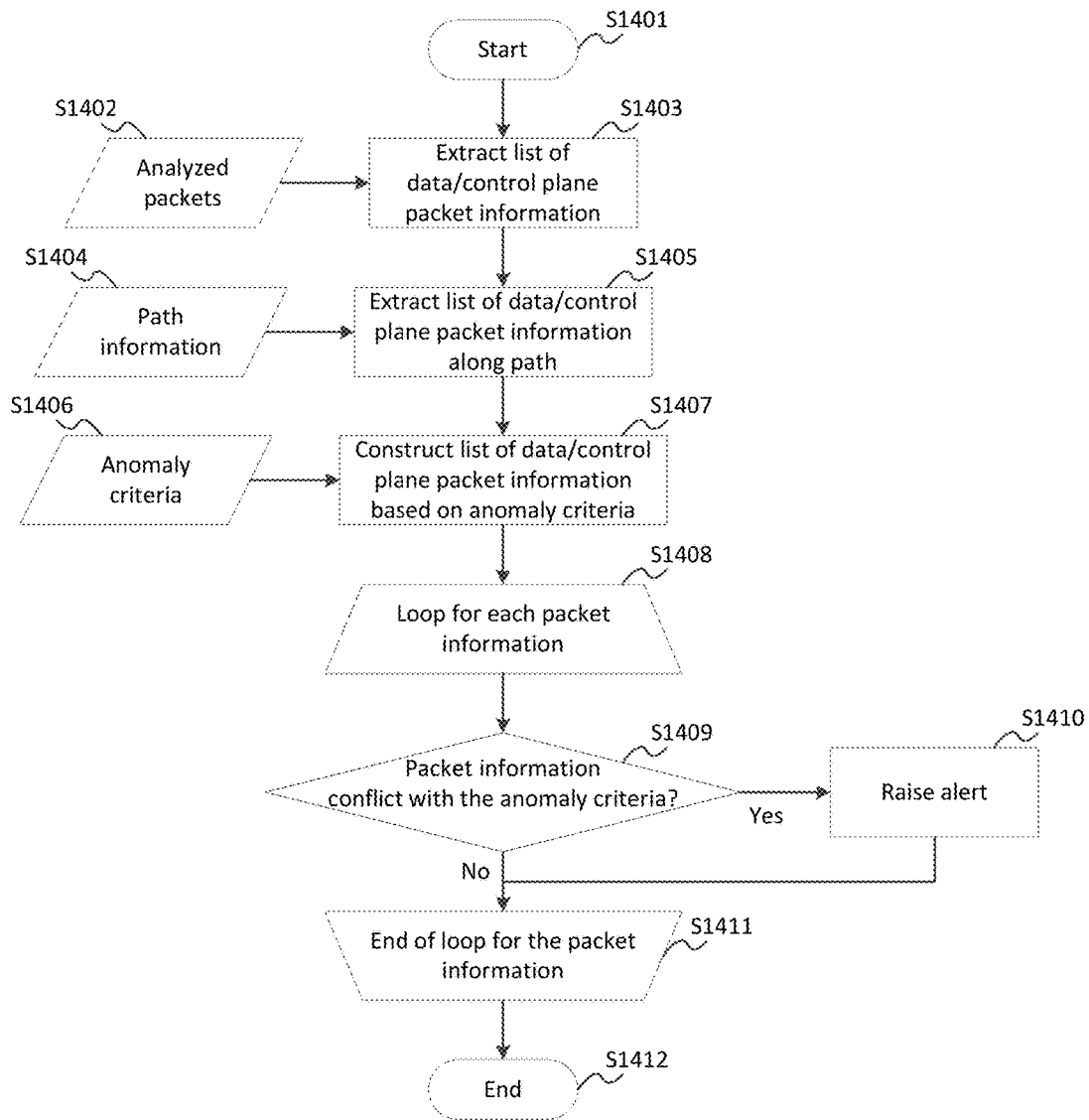
FIG. 9 illustrates the flow diagram from anomaly monitoring in accordance with an example implementation.

FIG. 9 illustrates the flow diagram from anomaly monitoring in accordance with an example implementation. The flow begins at S1401, wherein analyzed packets S1402, Path information S1404 and anomaly criteria S1406 are processed. At S1403, the flow is configured to extract the list of data/control plane packet information from the analyzed packets of S1402. At S1405, the flow is configured to extract the list of data/control plane packet information along path from path information S1404. At S1407, the flow is configured to construct a list of data/control plane packet information based on anomaly criteria from the anomaly criteria of S1406. At S1408, a loop is initiated for each entry in the list of packet information from the analyzed packets of S1402. At S1409, a check is performed to determine if the packet information conflicts with the anomaly criteria. If so (Yes) the flow proceeds to S1410 to provide an alert to the user. Otherwise (No), the flow proceeds to S1411 to end the packet information loop. When all of the packet information is processed, the loop ends at S1412.

First Example Implementation of Simple Multicast Service

Figure 10:
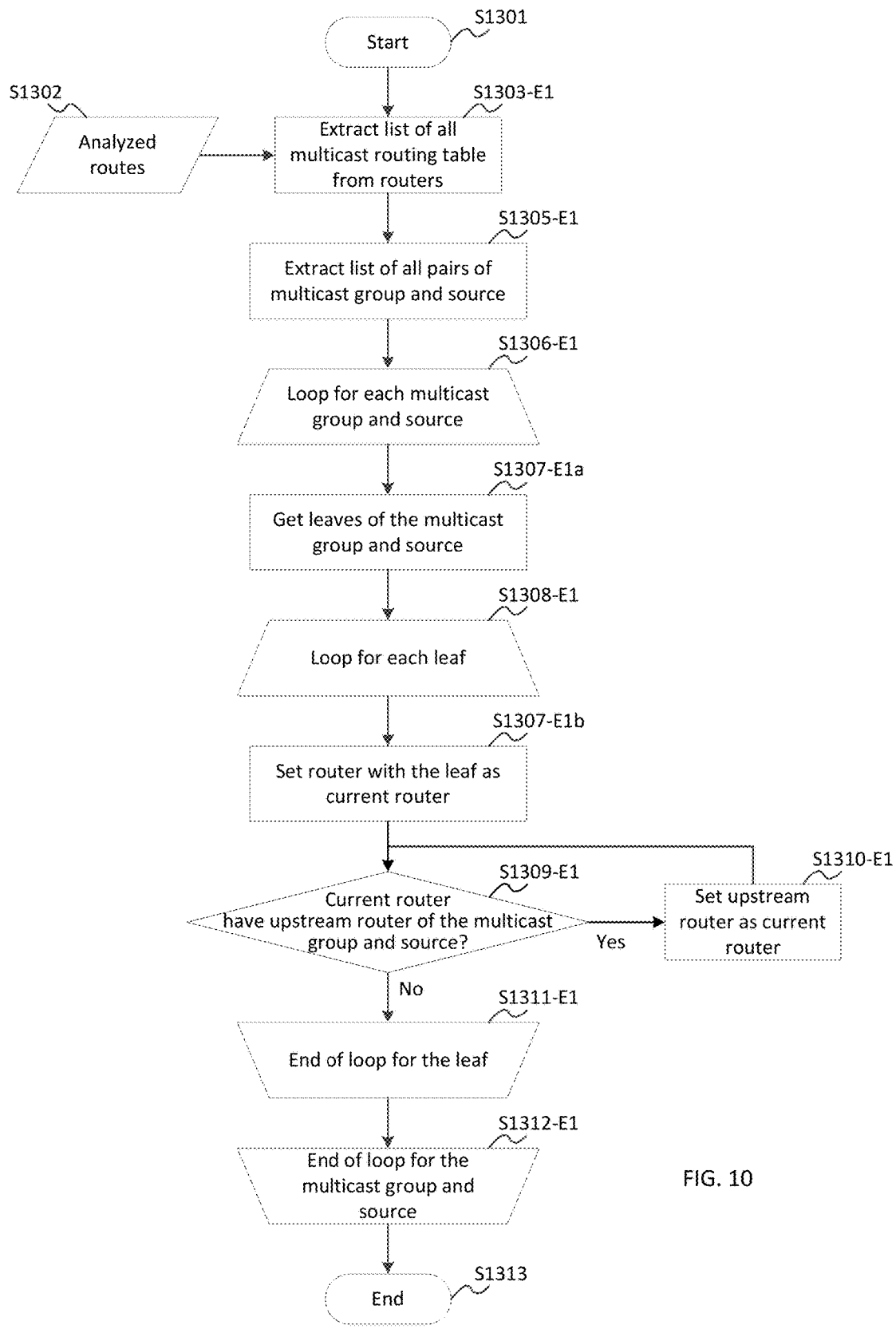
FIG. 10 illustrates a flow diagram for the multicast service case, in accordance with an example implementation.

In an example implementation for facilitating a multicast service case, the architecture of FIG. 5 can be utilized, and depending on the desired implementation, the target path block 110 can be rendered to be optional, as the multicast routing table may contain information indicative of the effective route that is created when the receiver starts service and deleted when the receiver stops service. FIG. 10 illustrates a flow diagram for the multicast service case, in accordance with an example implementation. The differences from the flow of FIG. 8 includes the modification at S1303-E1 wherein the flow extracts list of all multicast routing tables from routers. At S1305-E1 the flow extracts list of all pairs of multicast groups and sources. At S1306-E1 a loop is created for each multicast group and source pair. At S1307-E1a, the flow obtains leaves of the multicast group and source pair. At S1308-E1 a loop is created for each leaf. At S1307-E1b, the router is set with the leaf as current router. At S1309-E1 a check is performed to determine if the current router has the upstream router of the multicast group and source pair. If so (Yes), then the flow proceeds to S1310-E1 to set the upstream router as current router. Otherwise (No), the flow proceeds to S1311-E1 wherein the loop is ended for the leaf. When all leaves are processed, the flow proceeds to S1312-E1 to end the loop for the multicast group and source pair. When all multicast group and source pairs are ended, the flow proceeds to S1313 to end the flow.

Figure 11:
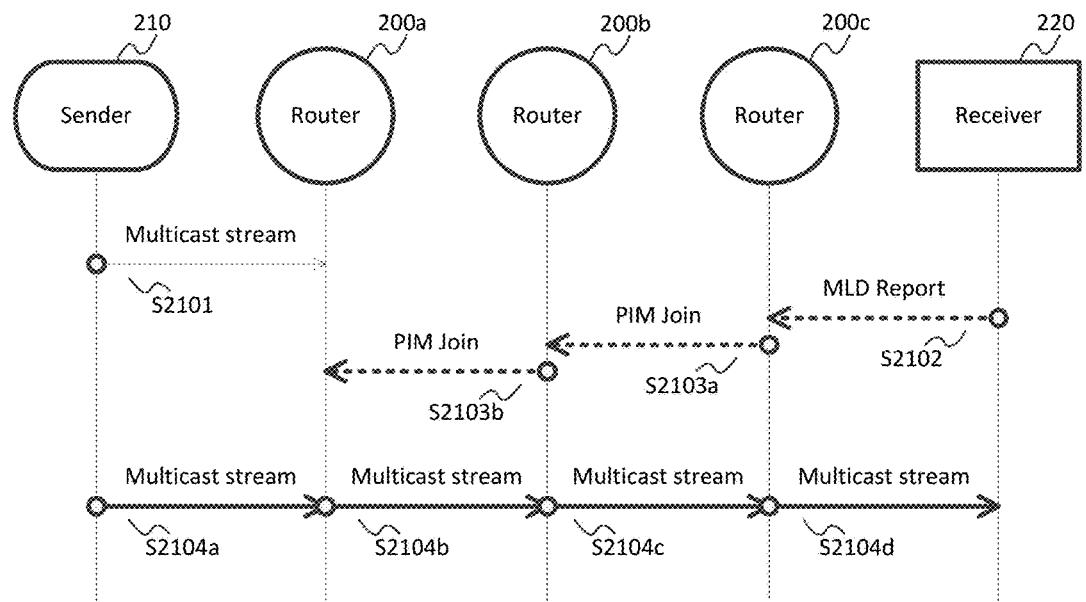
FIG. 11 illustrates a sequence diagram for the multicast service case, in accordance with an example implementation.

FIG. 11 illustrates a sequence diagram for the multicast case, in accordance with an example implementation. Sender 210 sends multicast stream to neighboring router 200a (S2101). When the receiver 220 starts receiving this stream, the receiver sends MLD Report to express this request to neighboring router 200c (S2102), and routers 200c and 200b send PIM Join to create multicast routing table toward upstream neighbors (S2103a, S2103b). After these requests reach the router 200a, the multicast stream is transmitted from sender 210 to receiver 220 (S2104a, S2104b, S2104c, S2104d).

Figure 12A:
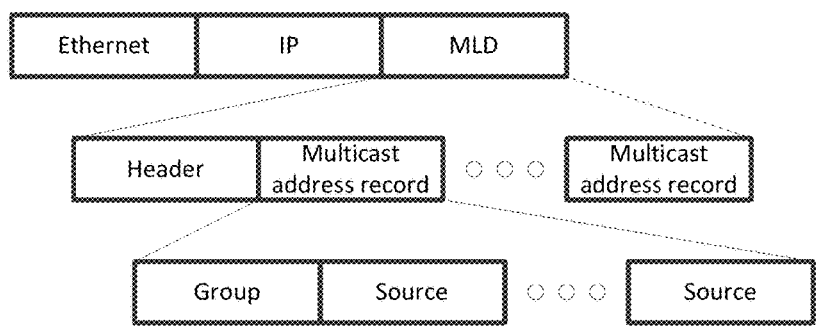
FIGS. 12(a) and 12(b) illustrates packet formats, in accordance with example implementations.
Figure 12B:
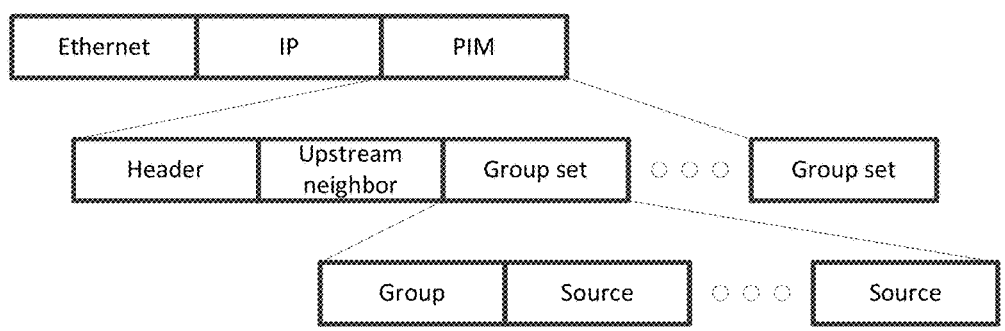

FIG. 12(a) illustrates a packet format of MLD Report in accordance with an example implementation. The MLD field in the packet contains a plurality multicast address records. Each record contains a multicast group and a source that indicates target path. FIG. 12(b) illustrates a packet format of PIM Join, in accordance with an example implementation. The PIM Join packet contains a plurality of group sets. Each group set contains a multicast group and source that indicates target path.

Figure 13:
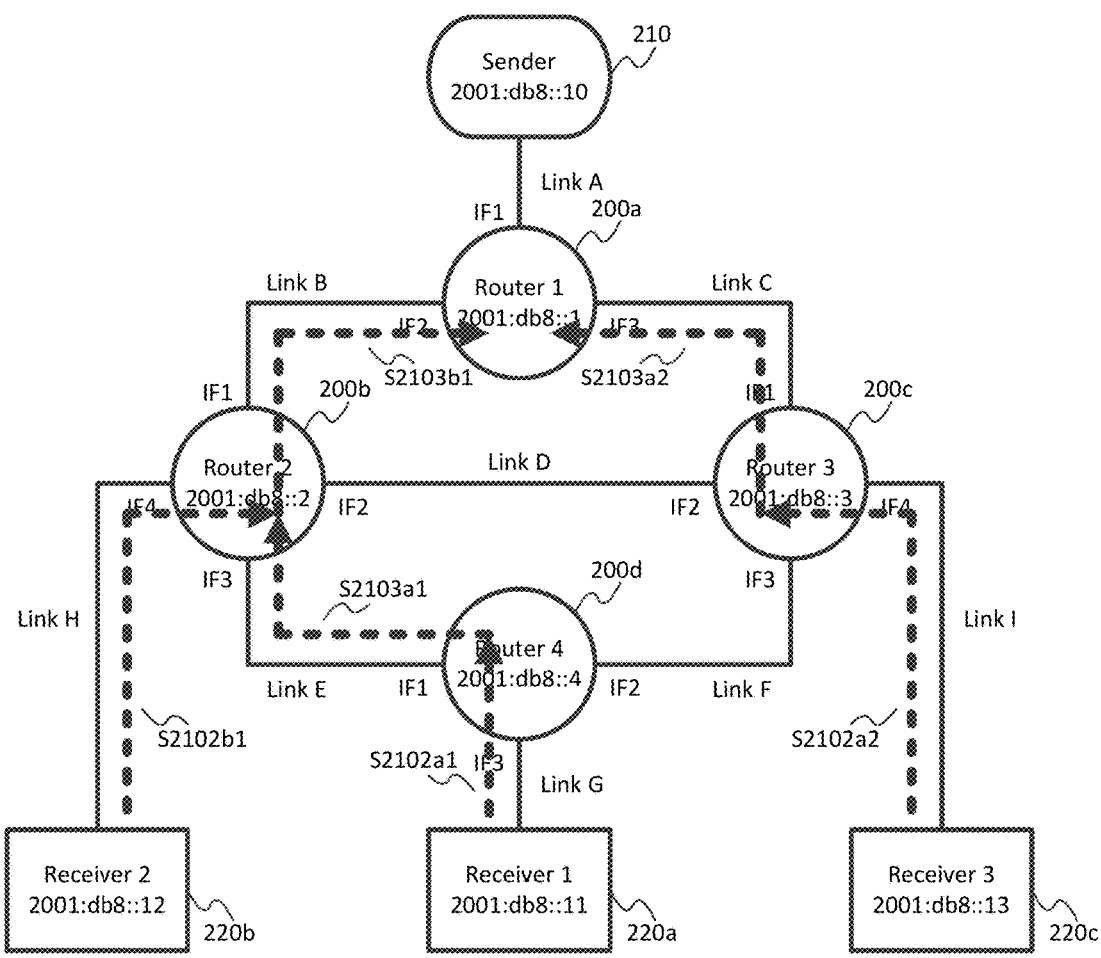
FIG. 13 illustrates a service request diagram for multicast service, in accordance with an example implementation.

FIG. 13 illustrates a service request diagram for multicast service, in accordance with an example implementation. At the flow of S2102a1, S2102b1 and S2102a2, the MLD Report as illustrated in FIG. 12(a) is transmitted, and the packets sent at the flow at S2102a1 and S2102b1 contain the same multicast group and source, whereas the flow at S2102a2 contains the other multicast group and source. At the flow of S2103a1, S2103b1 and S2103a2, the PIM Join as illustrated in FIG. 12(b) is transmitted, and the packets sent at the flow of S2103a1 and S2103b1 contain the same multicast group and source that is the same as that of MLD Report at S2102a1 and S2102b1. Packets sent at the flow at S2103a2 contains the other multicast group and source that is the same as that of MLD Report at S2102a2.

Figure 14:
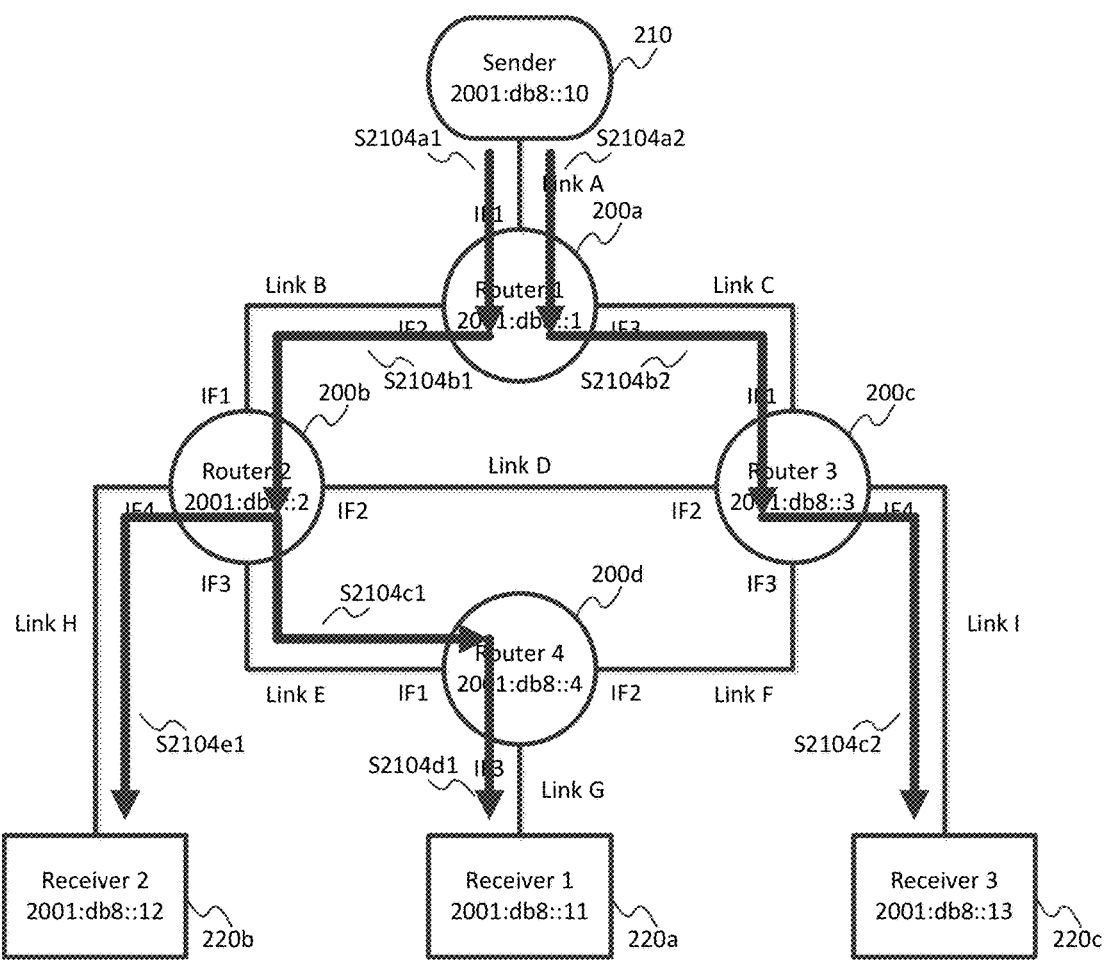
FIG. 14 illustrates a service stream diagram, in accordance with an example implementation.

FIG. 14 illustrates a service stream diagram, in accordance with an example implementation. The flow at S2104a1, S2104b1, S2104c1, S2104d1 and S2104e1 are a step through of the multicast stream of FIG. 11. The multicast group and source is the same as that of the MLD Report of S2102a1 and S2102b1, and PIM Join S2103a1 and S2103b1 of FIG. 13. The flow at S2104a2, S2104b2 and S2104c2 illustrates the multicast stream of FIG. 11. The multicast group and source is the same as that of MLD Report at S2102a2 and PIM Join at S2103a2, S2103b2 in FIG. 13.

FIG. 15 illustrates an integrated multicast routing table for FIG. 14 that is generated at route analyzing module 102 in FIG. 5 by gathering routing tables from each router. For example, items #1 and #2 are from Router 1 200a, items #3 and #4 are from Router 2 200b, item #5 is from Router 3 200c, and item #6 is from Router 4 200d. Item #1 shows the route for service stream S2104b1 in FIG. 14, #2 shows the route for service stream S2104b2, #3 shows the route for service stream S2104c1, #4 shows the route for service stream S2104e1, #5 shows the route for service stream S2104c2, and #6 shows the route for service stream S2104d1. The flag LH (Last Hop) indicates that the outgoing interface of that item is a leaf. The flag FH (First Hop) indicates the incoming interface of that item neighboring sender that has the same IP as the source of that item.

FIG. 16 illustrates the path information table that is generated at path information block 120 in FIG. 5 by utilizing the flow diagram of FIG. 10. The input for the flow at S1302 is the integrated multicast routing table shown in FIG. 15. The flow of S1303-E1 extracts a list of each of the items in FIG. 15. The flow at S1305-E1 extract list of all pairs of multicast groups and sources, i.e. items #1, #3, #4 and #6 are listed, and items #2 and #5 are listed. The flow at S1306-E1 initiates a loop for each of the two pairs, i.e. (2001:db8::10, ff38::1) and (2001:db8::10, ff38::2). The flow at S1307-E1a provides two leaves for the pair (2001: db8::10, ff38::1), i.e. outgoing interface of items #4 and #6, and one leaf for the pair (2001:db8::10, ff38::2), i.e. outgoing interface of item #5. The flow at S1308-E1 initiates a loop for each of the leaves.

When the leaf is the outgoing interface of item #4, the flow at S1307-E1b set router 2 as current router. The flow at S1309-E1 determines router 1 to be the upstream neighbor of item #4. The flow at S1310-E1 sets router 1 as current router, and the item of this current router, i.e. the item of router 1 that has the same pair (2001:db8::10, ff38::1) as item #4 is item #1. The flow at S1309-E1 for the second iteration of the loop determines that there is no upstream router about item #1. Thus, the flow diagram generates a part of path1, i.e. items #1 and #3, in FIG. 16. In the same way, other part of path1, i.e. items #1, #2 and #4, and path2, i.e. items #5 and #6, in FIG. 16 are generated from items #6, #3 and #1, and items #5 and #2 in FIG. 15.

FIG. 17 illustrates an analyzed packet information table, in accordance with an example implementation. Time column indicates monitored time and duration indicates monitoring duration. Packets column indicates packet counts, but others measurements are also possible depending on the desired implementation e.g. octet counts, packet loss, delay, jitter, etc. Stream info as indicated in the note column indicates that the analyzed packet information contains stream information such as (2001:db8::10, ff38::1).

FIG. 18 illustrates a data plane packet information table, in accordance with an example implementation. The data plane packet information table is generated at the flow for data plane information generation 131a1 in FIG. 6 by selecting data plane packet information, e.g. MPEG stream, from FIG. 17. The selection of the data plane packet information occurs at the flow of S1403 in FIG. 9.

FIG. 19 illustrates the control plane packet information table generated at control plane information generating part 131a2 in FIG. 6 by selecting control plane packet information, e.g. PIM Join and MLD Report, from FIG. 17. The selection corresponds to the flow of S1403 in FIG. 9.

FIG. 20 illustrates the data plane and path matching table generated at data plane and path matching part 132a1 in FIG. 6 by extracting items from FIG. 18 those that match path information in FIG. 16. For example, items #1, #3 in FIG. 18 match item #1 in FIG. 16 and items #5, #7 in FIG. 18 match item #3 in FIG. 16, and those become items #1 and #3 in FIG. 20. The described flow is the execution of S1405 in FIG. 9.

FIG. 21 illustrates a control plane and path matching table, in accordance with an example implementation. The table is generated at control plane and path matching at the flow of 132a2 in FIG. 6 by extracting items in FIG. 19 those match path information in FIG. 16, e.g. item #1 in FIG. 19 matches item #1 in FIG. 16 and items #3, #5 in FIG. 19 match item #3 in FIG. 16, and those become items #1, #3 and #4 in FIG. 21. This is executed at the flow of S1405 in FIG. 9.

FIG. 22 illustrates an example of anomaly criteria for data plane, in accordance with an example implementation. The anomaly criteria is stored at anomaly criteria 132c in FIG. 6. The anomaly criteria indicate that numbers of packets at an incoming interface and an outgoing interface of the same router on a path are the same. This example of anomaly criteria can be a comparison between any two points on the same path though the example of anomaly criteria in FIG. 22 is a comparison between an incoming interface and an outgoing interface on the same router.

FIG. 23 illustrates an example of anomaly criteria for control plane, in accordance with an example implementation. The anomaly criteria is stored at anomaly criteria 132c in FIG. 6. The anomaly criteria indicates that the PIM Join is robust to 2 packet losses in 3 cycles (e.g. 180 seconds) and the MLD Report is robust to 1 packet loss in 2 cycles (e.g. 250 seconds).

FIG. 24 illustrates data plane anomaly monitoring table generated at data plane anomaly monitoring part 132b1 in FIG. 6. This table is subset of data plane and path matching table in FIG. 20 at the time 01:00:01 because anomaly criteria for data plane in FIG. 22 can be adapted to any duration. The described flow is the execution of S1407 in FIG. 9.

FIG. 25 illustrates control plane anomaly monitoring table generated at control anomaly monitoring part 132b2 in FIG. 6. This table is generated by gathering each item of control plane and path matching table in FIG. 21, i.e. gathering items during 00:03:00 for PIM Join because the anomaly criteria for control plane in FIG. 23 requires duration of 3 cycles, and gathering items during 00:04:10 for MLD Report because anomaly criteria for control plane in FIG. 23 requires a duration of 2 cycles. This flow is the flow of S1407 in FIG. 9.

Second Example Implementation of Complex Multicast Service

In an example implementation for multicast service, there can be a re-transmission server that connects a plurality of multicast streams, such as a server for inserting advertisement, server for multiplexing multiple streams into one multicast stream, and so on. In such example implementations, the re-transmission server can operate as a sender as well as a receiver. FIGS. 26 to 30 illustrate various aspects of the complex multicast service case, in accordance with an example implementation.

Figure 26:
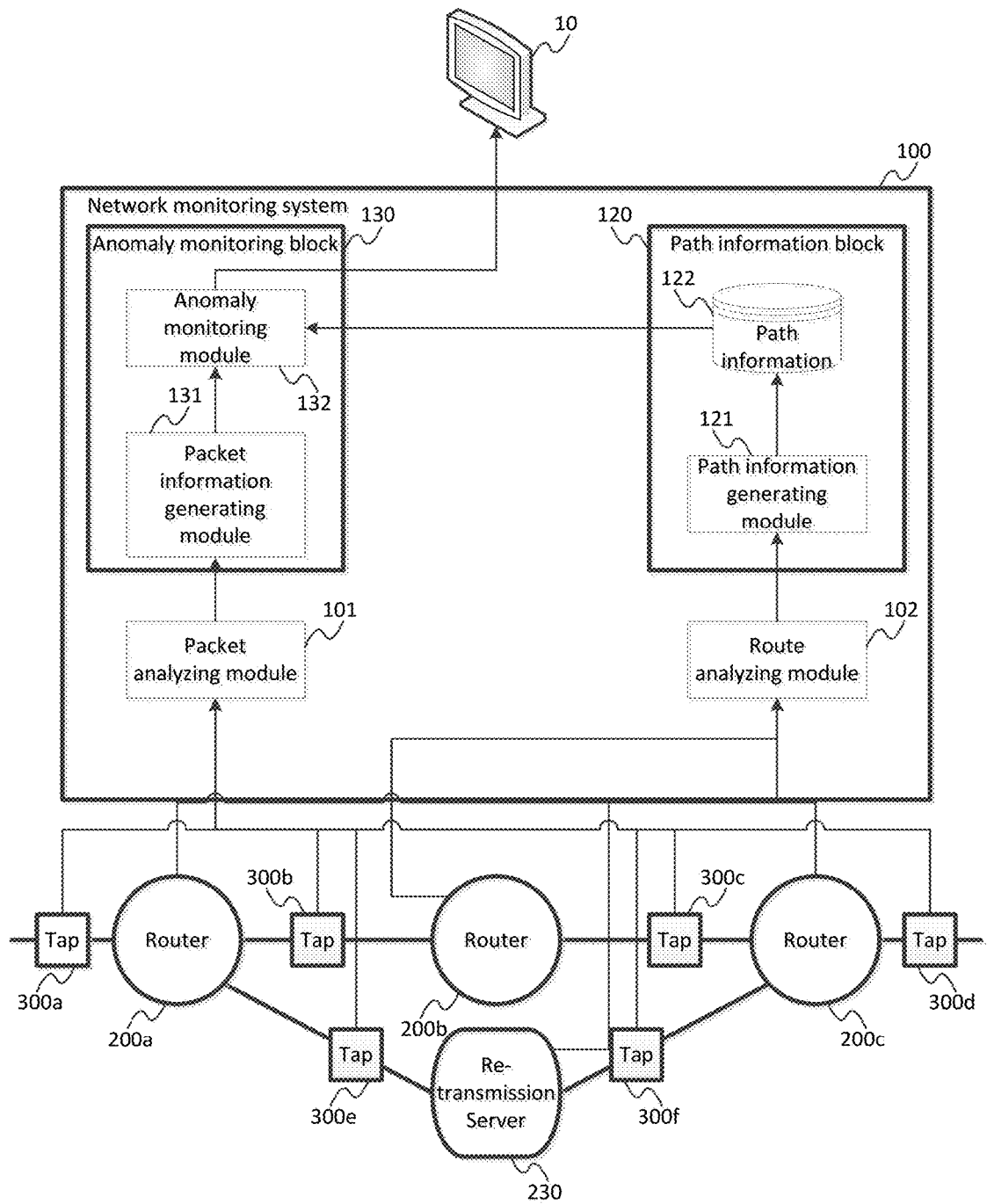
FIGS. 26 to 30 illustrate various architectural aspects of the complex multicast service case, in accordance with an example implementation.

FIG. 26 illustrates an example system diagram for the complex multicast service case, in accordance with an example implementation. In the present example implementation, a re-transmission server 230 that connects multiple multicast streams, e.g. server for inserting advertisement, server for multiplexing multiple streams into one multicast stream, and so on.

Figure 27:
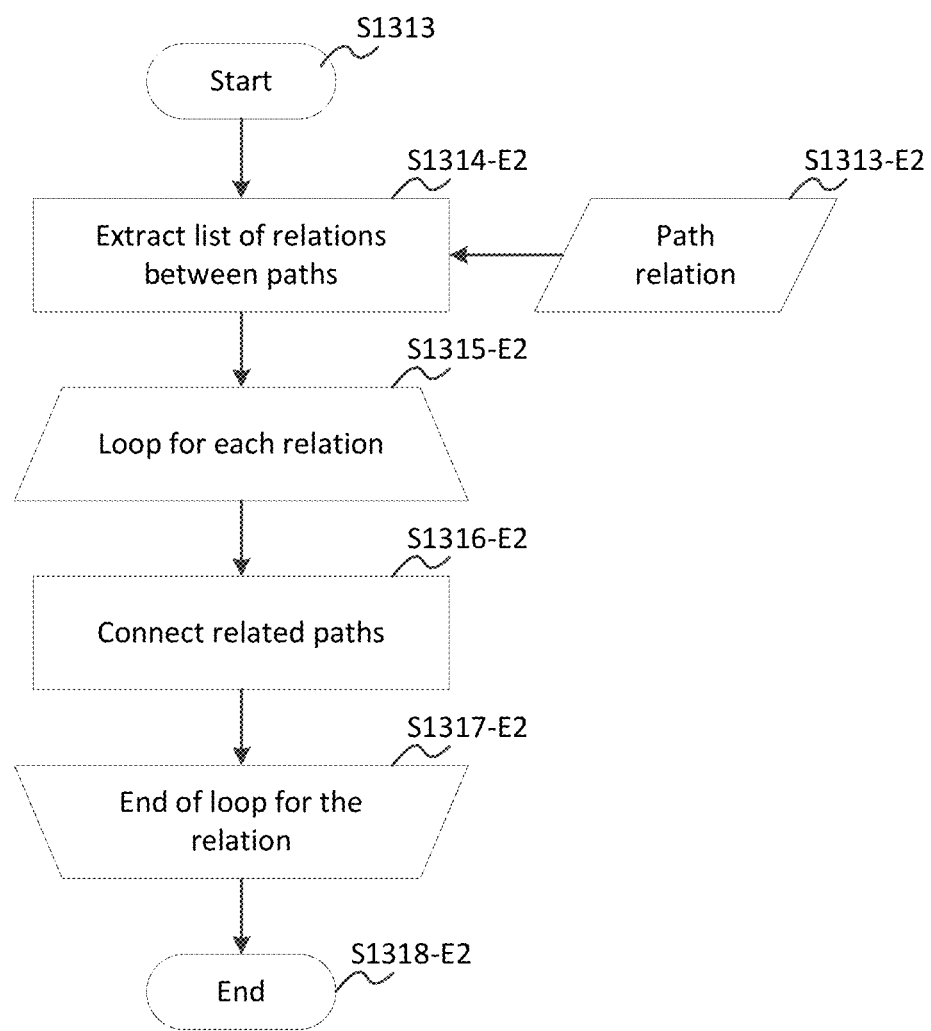

FIG. 27 illustrates a flow diagram for a retransmission server in accordance with an example implementation. In this example implementation, the flow takes place from S1313 of FIG. 10. The process begins at S1313-E2, when path relation information is obtained. At S1314-E2, the flow extracts the list of relations between paths based on the obtained path relation information. At S1315-E2, the flow initiates a loop for each relation from the path relation information. At S1316-E2 the flow connects related paths. At S1317-E2, the flow ends the loop for the relation. When all relations are processed, the process terminates at S1318-E2.

Figure 28:
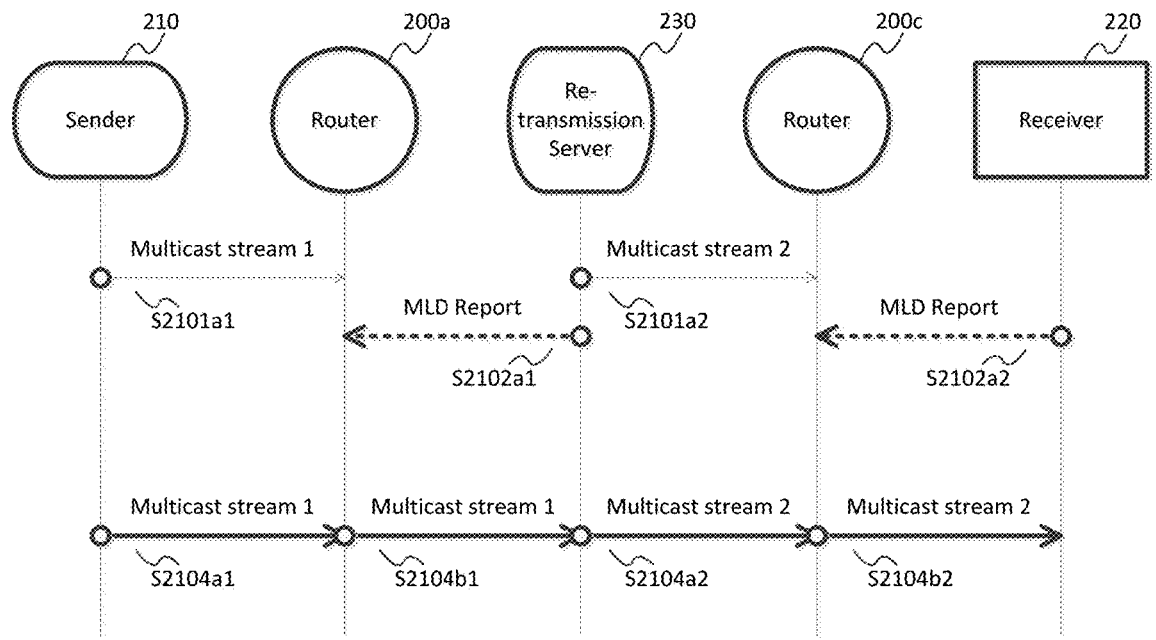

FIG. 28 illustrates a sequence diagram for the complex multicast service case, in accordance with an example implementation. In the example implementation of FIG. 28, there is a re-transmission server 230, a service request such as MLD Report and PIM Join are changed at the re-transmission server 230, and multicast streams are connected at the re-transmission server 230. As shown in FIG. 26, the re-transmission server 230 is a sender as well as a receiver.

Figure 29:
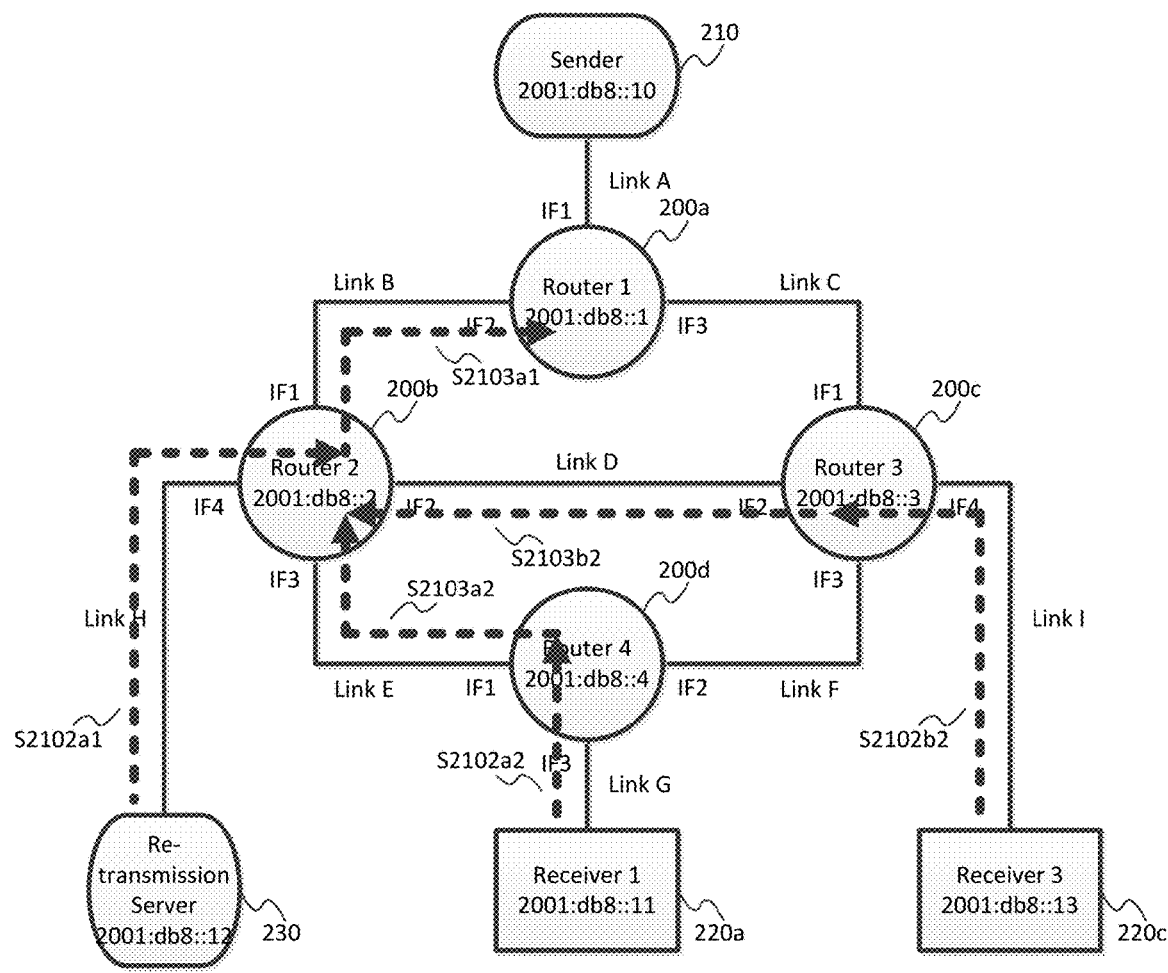

FIG. 29 illustrates a service request diagram for the complex multicast service case, in accordance with an example implementation. S2102a1 illustrates a MLD Report for a multicast stream 1, and S2103a1 illustrates a PIM Join for a multicast stream 1 as illustrated in FIG. 28. S2102a2 and S2102b2 illustrates a MLD Report for a multicast stream 2 in FIG. 26(c), and (S2103a2) and (S2103b2) show PIM Join for multicast stream 2 in FIG. 26. S2102a1 and S2103a1 contain the same multicast group and source that indicates a multicast stream 1, and S2102a2, S2102b2, S2103a2 and S2103b2 contain the other same multicast group and source that indicates a multicast stream 2.

Figure 30:
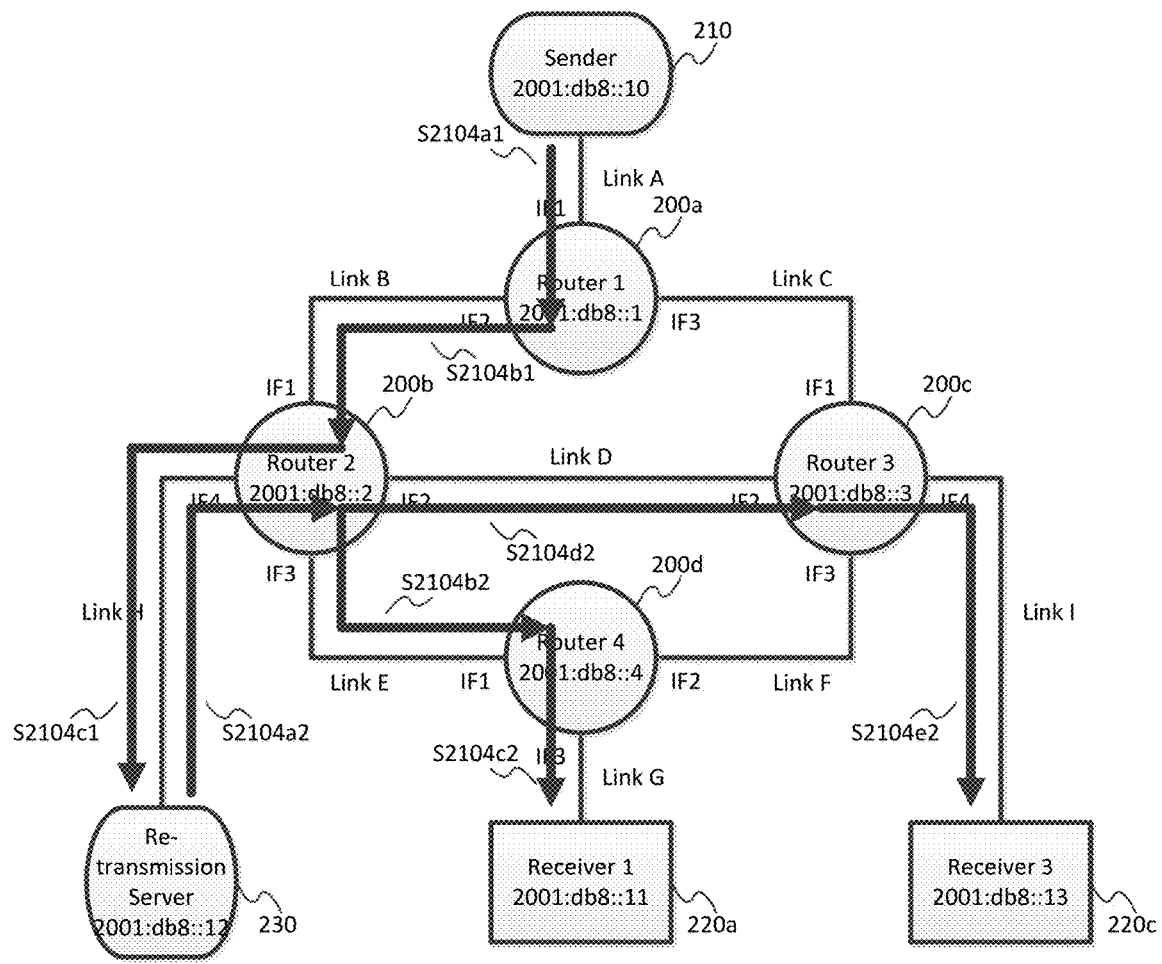

FIG. 30 illustrates a service stream diagram for the complex multicast service case, in accordance with an example implementation. S2104a1, S2104b1 and S2104c1 illustrate the multicast stream 1 as shown in FIG. 27. The multicast group and source is the same as that of MLD Report S2102a1 and PIM Join S2103a1 for multicast stream 1 in FIG. 29, and S2104a2, S2104b2, S2104c2, S2104d2 and S2104e2 show multicast stream 2 shown in FIG. 28 and the multicast group and source is the same as that of MLD Report S2102a2, S2102b2 and PIM Join S2103a2, S2103b2 in FIG. 29.

FIG. 31 illustrates an integrated multicast routing table that can be generated at route analyzing module (102) by gathering routing tables from each router, i.e. item #1 is from Router 1 (200a), items #2, #3 and #4 are from Router 2 (200b), item #5 is from Router 3 (200c), and item #6 is from Router 4 (200d). Service stream 1 is the stream with the pair (2001:db8::10, ff38::1) and service stream 2 is the stream with the pair (2001:db8::12, ff38::2). In reference to FIG. 26(e), item #1 shows route for service stream 1 S2104b1, #2 shows route for service stream 1 S2104c1, #3 shows route for service stream 2 S2104b2, #4 shows route for service stream 2 S2104d2, #5 shows route for service stream S2104e2, and #6 shows route for service stream 2 S2104c2. Router 2 (200b) has flags LH for service stream 1 and FH for service stream 2.

FIG. 32 illustrates path information table without connection that is generated at path information block (120) by the flow diagram of FIG. 10 by using FIG. 31 as input. The flow at S1303-E1 extracts the list of each of the items in FIG. 31. The flow at S1305-E1 extract list of all pairs of multicast group and source, i.e. items #1, #2 are listed, items #3, #5 are listed, and items #3, #6 are listed. The flow at S1306-E1 makes a loop for two pairs, i.e. (2001:db8::10, ff38::1) and (2001:db8::12, ff38::2). The flow at S1307-E1a provides one leaf for the pair (2001:db8::10, ff38::1), i.e. outgoing interface of item #2, and two leaves for the pair (2001:db8::12, ff38::2), i.e. outgoing interface of items #5 and #6. The flow at S1308-E1 makes loop for above each leaf. When the leaf is outgoing interface of item #2, the flow at S1307-E1b set router 2 as current router. The flow at S1309-E1 find router 1 to be the upstream neighbor of item #2. The flow at S1310-E1 sets router 1 as current router, and the item of this current router, i.e. the item of router 1 that has the same pair (2001:db8::10, ff38::1) as item #2 is item #1. The flow at S1309-E1 for the second time find there is no upstream router about item #1. These series of steps generates the path1, i.e. items #1 and #2, in FIG. 32. In the same way, path2 in FIG. 32 is generated from items #3 and #5, and items #4 and #6 in FIG. 31.

FIG. 33 illustrates a path connection table, in accordance with an example implementation. The path connection table is gathered from the re-transmission server e.g. its configuration or generated from comparison between contents of incoming and outgoing streams by route analyzing module 102. The pair (2001:db8::10, ff38::1) indicates multicast stream 1 arrived at the re-transmission server and the pair (2001:db8::12, ff38::2) indicates multicast stream 2 departed from the re-transmission server. This information is an input for the flow at S1313-E2 and listed at the flow of S1314-E2 in the flow diagram of FIG. 27. The flow of S1315-E2 initiates a loop for the relation based on FIG. 33. In this example, there is one item #1. The flow of S1316-E2 connects path1 and path2 based on this item #1 by comparing each pair of group and source between FIG. 32 and FIG. 33. As a result of these steps, the path information table of FIG. 34 can be generated.

FIG. 35 illustrates an analyzed packet information table, in accordance with an example implementation. In the example of FIG. 35, the time indicates monitored time and duration indicates the monitoring duration. "Packets" indicates packet counts. Others fields are possible as measurements in accordance with the desired implementation, such as octet counts, packet loss, delay, jitter, and so on. Stream info at note indicates that the analyzed packet information contains stream information such as stream1 (2001:db8::10, ff38::1) and stream2 (2001:db8::12, ff38::2).

FIG. 36 illustrates the data plane packet information table generated at the data plane information generating part for data plane information generation 131a1 in FIG. 6 by selecting data plane packet information, e.g. MPEG stream, from FIG. 34. The selection of the data plane packet information occurs at the flow of S1403 in FIG. 9. The information table of FIG. 36 can be implemented similarly to FIG. 18. Similar tables for generating and utilizing a data plane and path matching table, and control plane and path matching table can be implemented as illustrated in FIGS. 18-21 by utilizing the flow diagram of FIG. 9 for the retransmission server case, and can be utilized for facilitating the desired multicast implementation.

Third Example Implementation of Unicast Service

In a third example implementation, for unicast service case, there can be a session management server that mediates between a sender and a receiver if the service is client-server model or between users if the service is peer-to-peer model.

Figure 37:
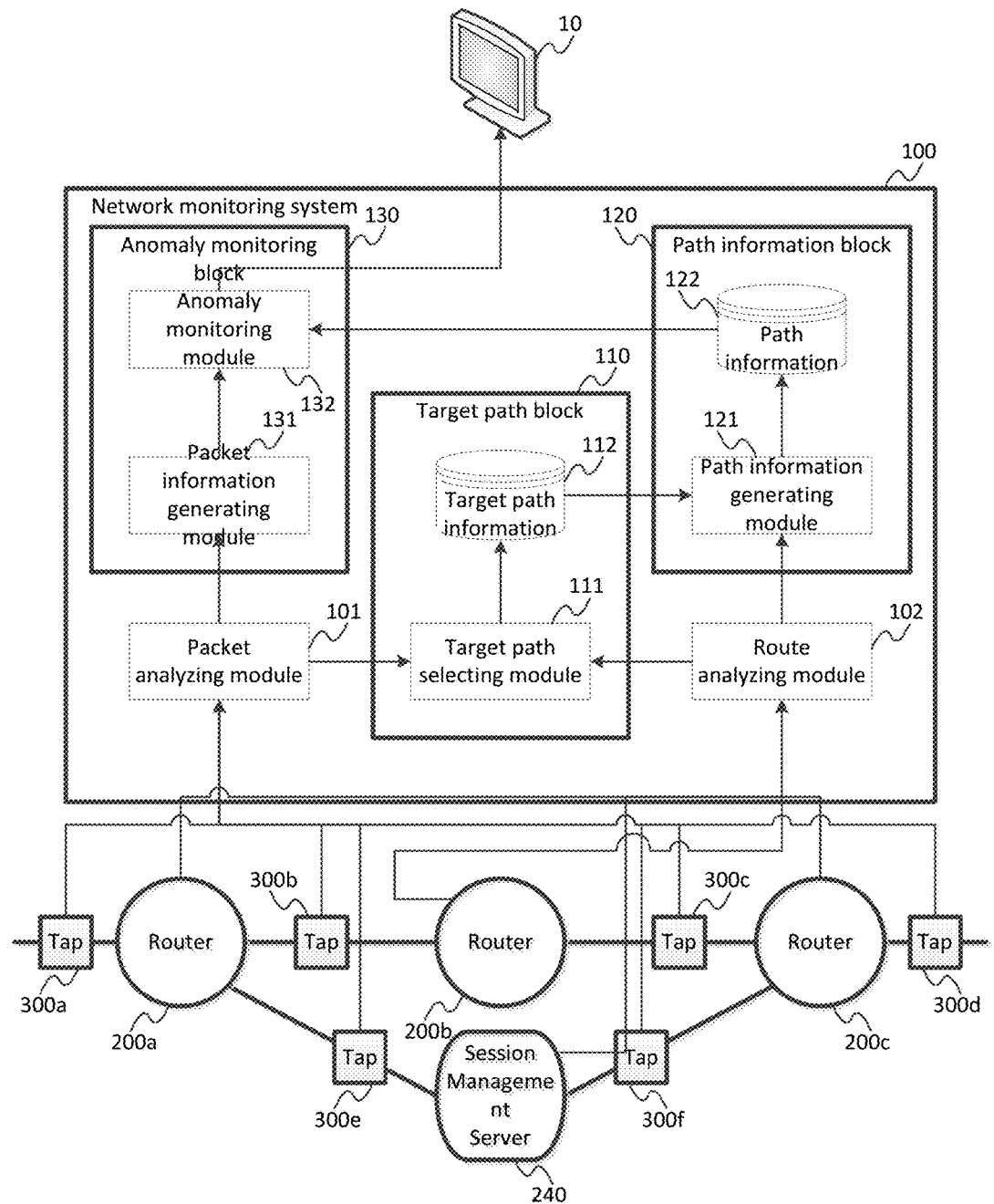
FIGS. 37 to 40 illustrate various aspects of the unicast case, in accordance with an example implementation.

FIG. 37 illustrates an example system diagram for the unicast service case, in accordance with an example implementation. In the example of FIG. 37, there is a session management server (240) that mediates between sender and receiver if the service is client-server model or between users if the service is peer-to-peer model.

Figure 38:
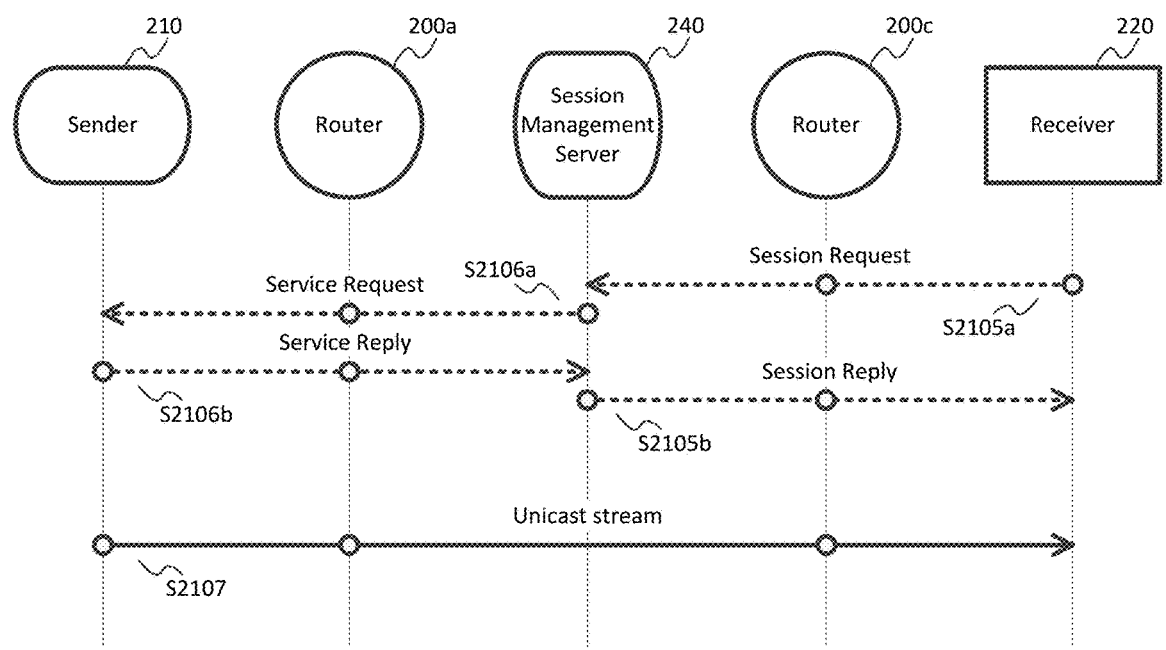

FIG. 38 illustrates a sequence diagram in the case of client-server model such as video on demand service in accordance with an example implementation. When receiver 220 starts receiving a video stream, receiver 220 sends a session request (as shown at S2105a) with information that indicates requesting contents to session management server 240, and. Session management server 220 sends service request with information that indicates the requesting receiver to sender 210 as shown at S2106a. After the request reaches sender 210, the requested service stream is transmitted from sender 210 to receiver 220 as shown at S2107 in unicast, and as shown at 2106b and 2105b as a session reply. Session request S2105a, and reply S2105b, and service request S2106a and reply S2106b are illustrated. The endpoint information, i.e. IP of sender 210 and receiver 220, and operation can be extracted from these request and reply messages. Unicast service stream S2107 is transmitted from sender 210 to receiver 220.

Figure 39:
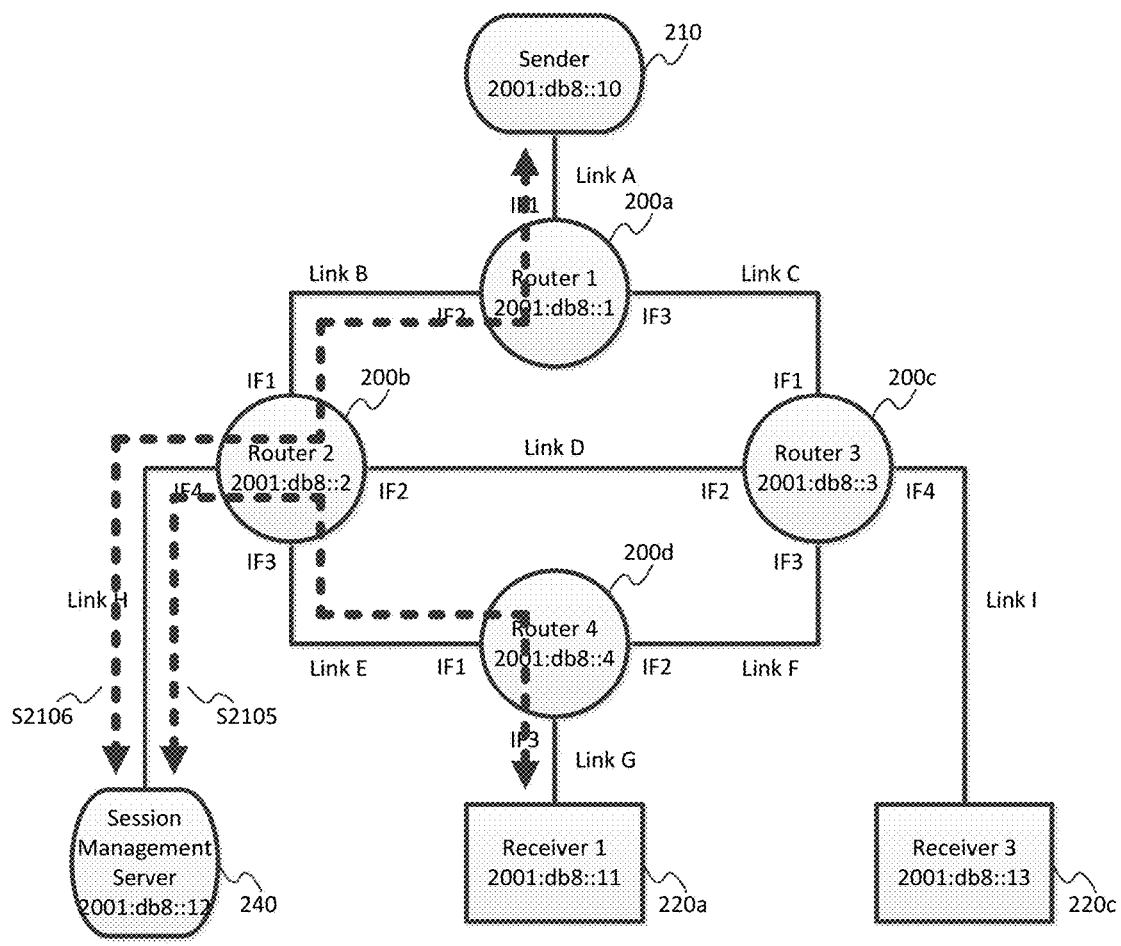
Figure 40:
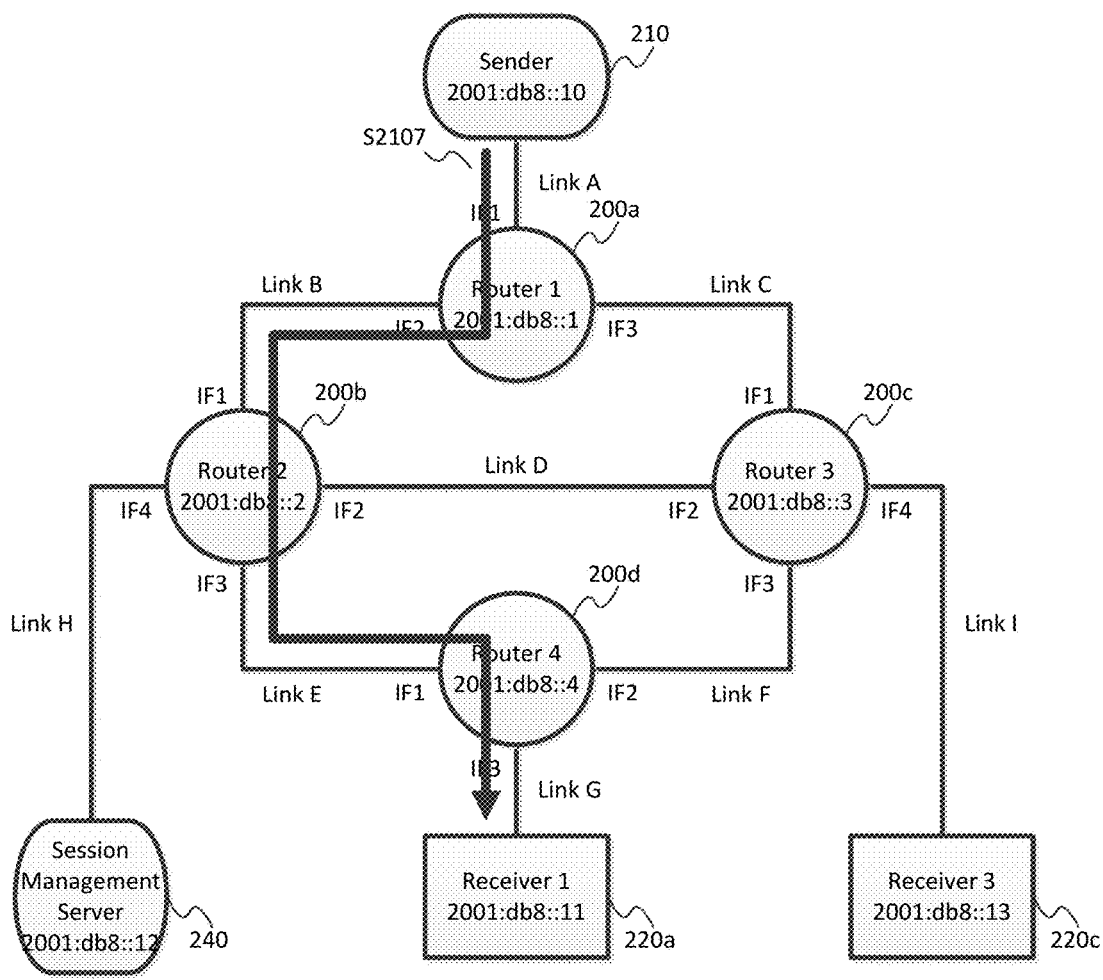

FIG. 39 illustrates a service request diagram, in accordance with an example implementation. S2105 illustrates session request and reply, and S2106 illustrates a service request and reply. The information of endpoints, i.e. IP of sender 210 and receiver 220, and operation can be extracted from these request and reply messages. FIG. 40 illustrates a service stream diagram, in accordance with an example implementation. S2107 shows service stream transmitted from sender 210 to receiver 220.

Figure 41:
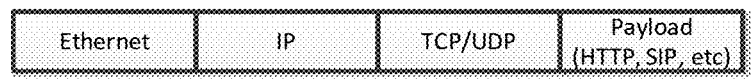
FIG. 41 illustrates the packet format that is used for session/service construction, in accordance with an example implementation.

FIG. 41 illustrates the packet format that is used for session/service construction in FIGS. 37 to 40. Several protocols such as HTTP (HyperText Transfer Protocol), SIP, and so on, are used as payload, and IP header and/or payload contain the information of endpoints of the service and operation such as starting or stopping the service.

FIG. 42 shows an integrated unicast routing table representative of the network topology that is generated at the route analyzing module 102 by gathering routing tables from each router, i.e. items #1-#7 are from Router1 200a as illustrated in FIGS. 39 and 40, items #8-#14 are from Router2 200b, items #15-#21 are from Router3 200c, and items #22-#28 are from Router4 200d. The flag C indicates the outgoing interface is neighboring the destination of that item. Normally unicast routing table includes all available routing information regardless of traffic existence.

FIG. 43 shows analyzed packet information table, in accordance with an example implementation. Time means monitored time and duration means duration of monitoring. Packets means packet counts but others are possible as measurements e.g. octet counts, packet loss, delay, jitter, etc. Stream info at note means this analyzed packet information contains stream information such as Sender IP (2001:db8:: 10), Receiver IP (2001:db8::11), operation commands (start, stop, etc.) though not clearly shown in this table.

FIG. 44 illustrates target path information table generated at target path block 110, in accordance with an example implementation, for a unicast service when utilizing the flow of FIG. 7(a). The input of the flow at S1102 is analyzed packet information table shown in FIG. 43. At S1103, the flow extracts service request packets which includes endpoints of service, i.e. extracts packets including stream info at note e.g. item #3, #6, etc. in FIG. 43 and gets each source IP and destination IP, including that of the session management server and stream information indicated by the stream info at note (e.g. Sender IP (2001:db8::10), Receiver IP (2001:db8::11), operation commands (start, stop, etc.)) as contained in those packets. The flow at S1104 makes the loop for each extracted packets. The flow at S1105 judges above operation commands. The flow at S1106 adds new endpoints to the target path information table if the flow at S1105 indicates the start operation, and the flow at S1107 deletes old endpoints from target path information table if the flow S1105 indicates the stop operation. If a service creates a specific route when the service stars and deletes when the service stops, the target path information table is generated with routing table as illustrated in FIG. 42 by following the flow of FIG. 7(a).

FIG. 45 shows path information table that is generated at path information block 120 through the use of the flow diagram FIG. 8 for a unicast service. The input for the flow at S1302 is integrated unicast routing table shown in FIG. 42. The flow at S1303 extracts list of each item in FIG. 42. The input of flow at S1304 is target path information table shown in FIG. 44. The flow at S1305 extracts list of each item of FIG. 44. The flow at S1306 makes loop for each endpoint, i.e. source 2001:db8::10, destination 2001:db8::11 and related server 2001:db8::12. The flow at S1307 provides routers neighboring above each endpoint, i.e. router1, router3 and router2 for each based on items #4, #26 and #13 in FIG. 41. The flow at S1308 makes loop for each pair of endpoints, i.e. (2001:db8::10, 2001:db8::11) related to data plane i.e. stream data transmission, and (2001:db8::11, 2001:db8::12) and (2001:db8::12, 2001:db8::10) related to control plane i.e. service session management. When the pair of endpoints is (2001:db8::10, 2001:db8::11), initial current router neighboring the endpoint 2001:db8::10 is router1 and step S1309 looks for route toward the other endpoint 2001:db8::11 and finds item #5 in FIG. 42. The flow at S1310 set router2 as next current router. The flow at S1309 for the second time finds item #12 in FIG. 42 and the flow at S1310 set router4 as next current router. The flow at S1309 for the third time finds item #26 that indicates the other endpoint 2001:db8::11 is neighboring router4 and there is no next router. The flow generates a part of path1, i.e. items #1, #2 and #3, in FIG. 45. In the same way, other parts of path1, i.e. items #4 and #5, and items #6 and #7 in FIG. 45 are generated from items #27 and #13, and items #11 and #4 in FIG. 42. Similar tables for generating and utilizing a data plane and path matching table, control plane and path matching table, data plane and path matching table, and control plane and path matching table as illustrated in FIGS. 18-21, can be implemented in accordance with the flow diagram of FIG. 9 for facilitating the desired unicast implementation.

Fourth Example Implementation for Mobile Service Case

Figure 46:
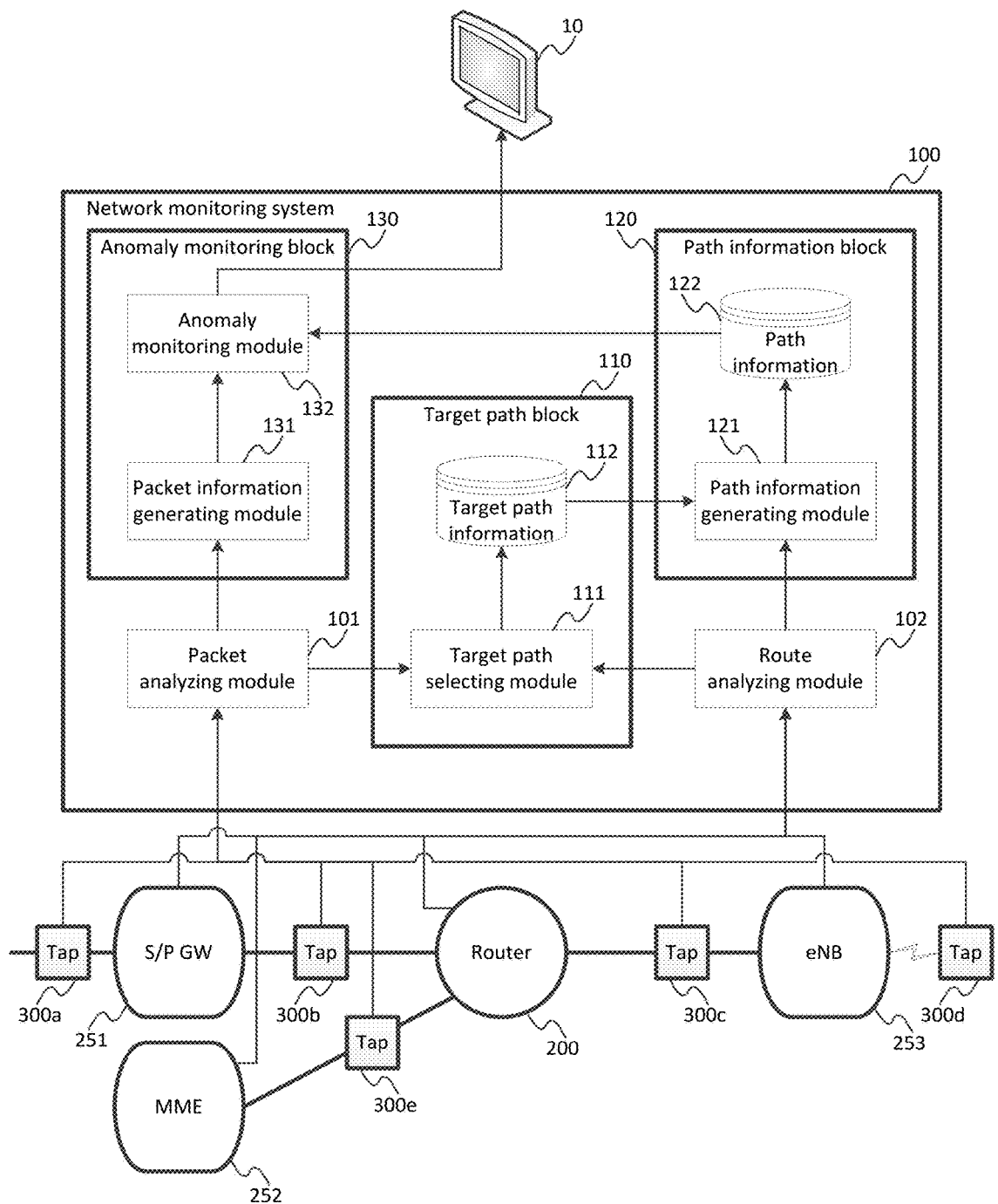
FIG. 46 illustrates a system environment for the mobile service case, in accordance with an example implementation.

FIG. 46 illustrates a system environment for the mobile service case, in accordance with an example implementation. The difference from FIG. 5 is there are several mobile equipment i.e. S/P GW (Serving/PDN Gateway) 251, MME (Mobility Management Entity) 252 and eNB (evolved Node B) (253) for managing the mobile session.

Figure 47:
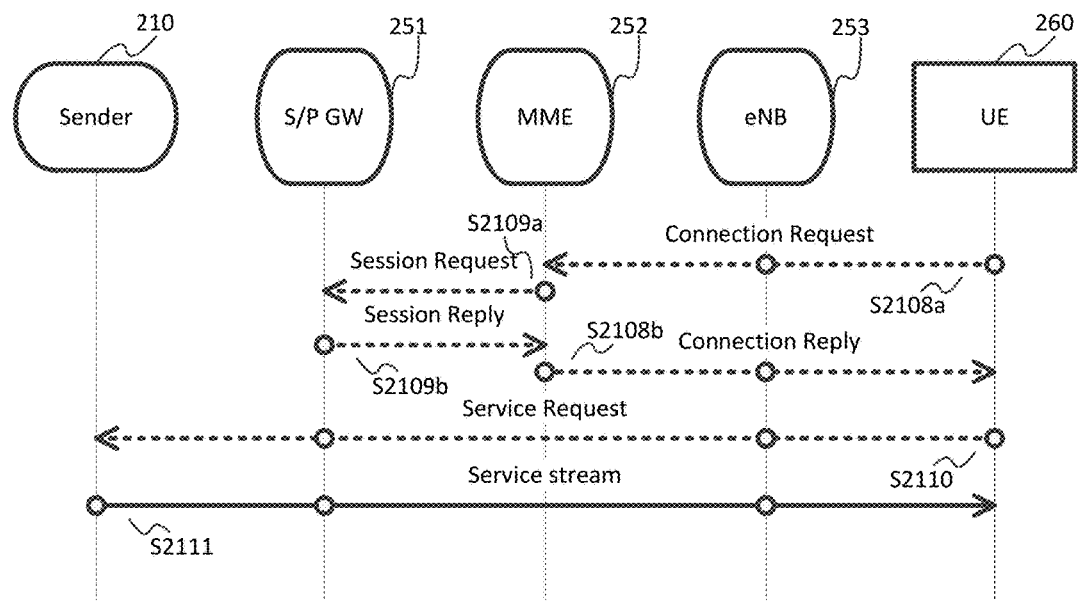
FIG. 47 illustrates a sequence diagram, in accordance with an example implementation.

FIG. 47 illustrates a sequence diagram, in accordance with an example implementation. When UE (User Equipment) 260 starts receiving service stream, it sends connection request via eNB 253 to MME 252 (S2108). MME 252 sends session request to S/P GW 251 (S2109). After these requests finished, UE 260 sends service request to sender 210 (S2110), and requested service stream is transmitted from sender 210 to UE 260 (S2111).

Figure 48:
FIG. 48 and FIG. 49 illustrate packet formats, in accordance with an example implementation.
Figure 49:
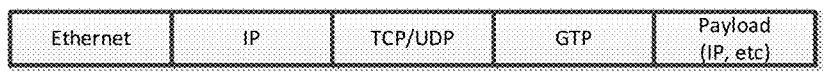

FIG. 48 and FIG. 49 illustrate packet formats those are used for connection/session/service construction in FIG. 47, in accordance with an example implementation. IP header and/or payload contain the information of endpoints of the service and operation such as starting or stopping the service.

Figure 50:
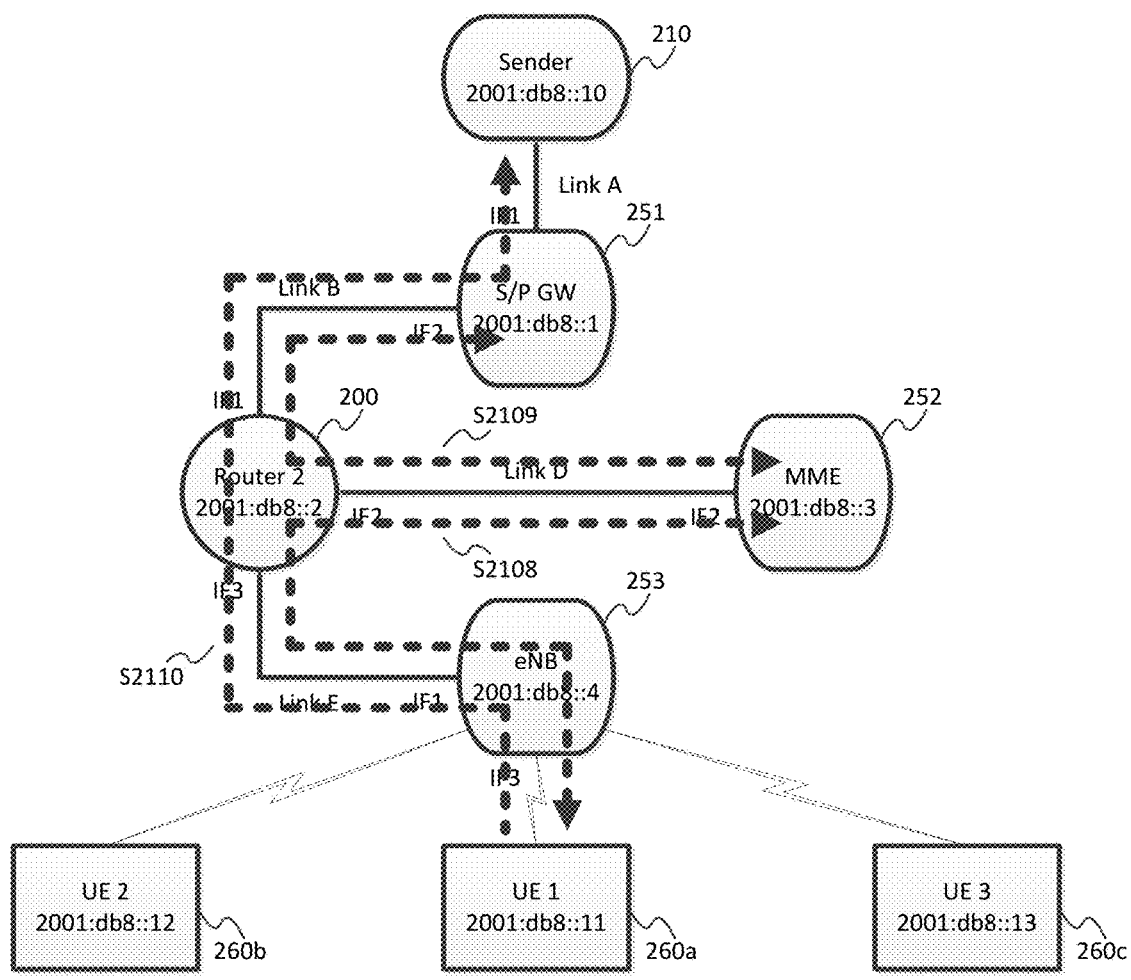
FIG. 50 illustrates a service request diagram for mobile service, in accordance with an example implementation.

FIG. 50 illustrates a service request diagram for mobile service, in accordance with an example implementation. (S2108) shows connection request and reply shown in FIG. 47, (S2109) shows session request and reply shown, and (S2110) shows service request shown in FIG. 47. As mentioned about FIG. 48 and FIG. 49, the information of endpoints, i.e. IP of sender 210 and UE1 260a, and operation can be extracted from these request and reply messages.

Figure 51:
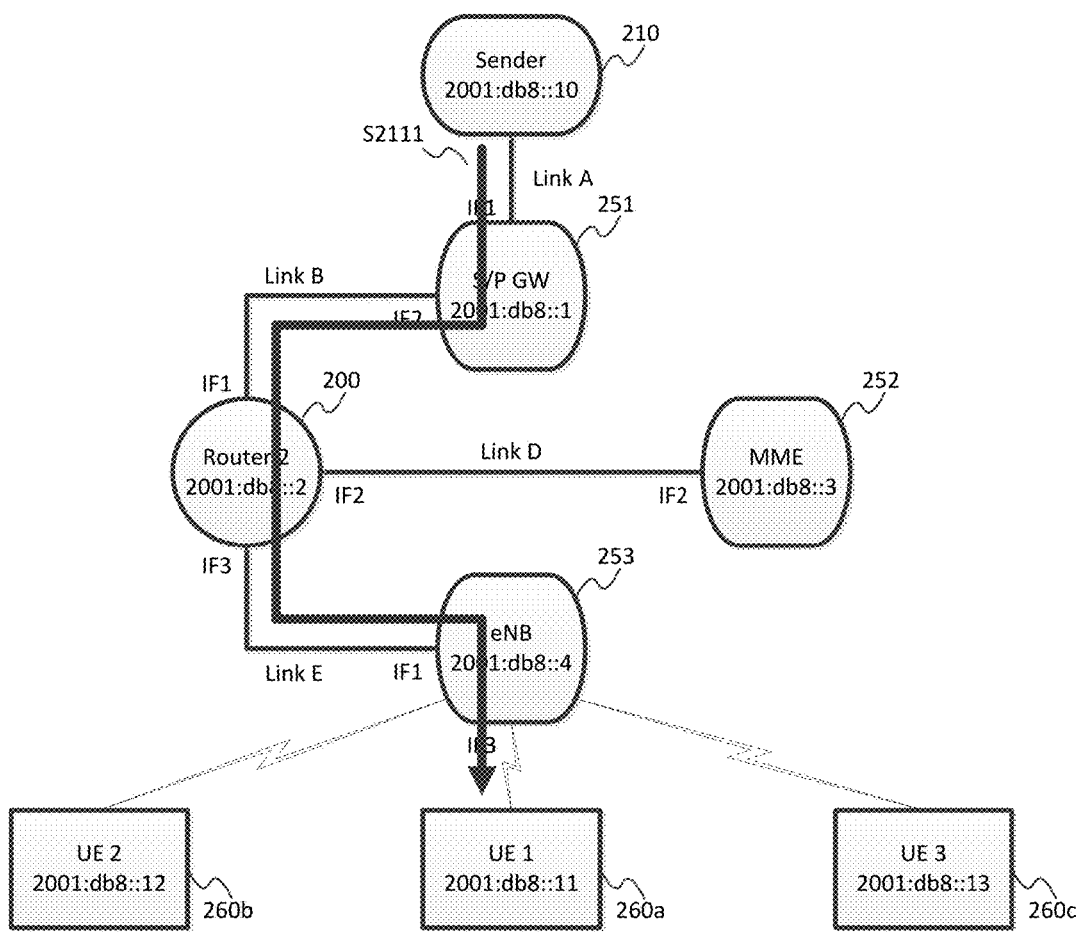
FIG. 51 illustrates an example service stream diagram, in accordance with an example implementation.

FIG. 51 illustrates an example service stream diagram, in accordance with an example implementation. S2111 illustrates service stream transmitted from sender 210 to UE1 260a as shown in FIG. 47.

FIG. 52 illustrates an integrated unicast routing table about the network topology, in accordance with an example implementation. The network topology of FIG. 52 is generated at route analyzing module (102) in FIG. 46 by gathering routing tables from each equipment, i.e. items #1-#3 are from Router2 (200), items #4-#10 are from S/P GW (251), items #11-#13 are from MME (252), and items #14-#20 are from eNB (253). The flag C indicates that the outgoing interface is neighboring the destination of the item. The flag T indicates outgoing interface is tunneled interface between S/P GW and eNB via Router2 with a packet format shown in FIG. 49.

FIG. 53 illustrates an analyzed packet information table, in accordance with an example implementation. Time indi- cates the monitored time and duration indicates the duration of monitoring. Packets indicates the packet count, however other measurements may also be applied according to the desired implementation, such as octet counts, packet loss, delay, jitter, and so on. Stream info at note indicates that the analyzed packet information contains stream information such as Sender IP (2001:db8::10), UE IP (2001:db8::11), operation commands (start, stop, etc.) though not clearly shown in this table. The IP 2001:db8::1* means IP 2001:db8::10 is encapsulated by 2001:db8::1, and IP 2001:db8::4* means IP 2001:db8::11 is encapsulated by 2001:db8::4 because of tunneled interface between S/P GW and eNB via Router2 with a packet format shown in FIG. 49.

FIG. 54 illustrates a target path information table generated at target path block (110) in FIG. 46 by applying the flow diagram FIG. 7, in accordance with an example implementation. Through applying the flow diagram of FIG. 7, the input of the flow at S1102 in FIG. 7 is analyzed packet information table shown in FIG. 43. The flow at S1103 extracts the service request packets those include endpoints of service, i.e. extracts packets including stream info at note e.g. item #2, #6, etc. in FIG. 53 and gets each source IP and destination IP including that of S/P GW, MME, eNB and stream information shown at note such as Sender IP (2001:db8::10), Receiver IP (2001:db8::11), operation commands (start, stop, etc.) contained in those packets. The flow at S1104 makes a loop for each of the extracted packets. The flow at S1105 judges above operation commands. The flow at S1106 adds new endpoints to target path information table if the result of the flow at S1105 indicates starting, and the flow at S1107 deletes old endpoints from target path information table if the result of the flow at S1105 indicates stopping. If a service creates specific route when the service stars and deletes when the service stops, target path information table is generated with routing table such as FIG. 52 by executing a flow diagram based on FIG. 7 and as according to the desired implementation.

FIG. 55 illustrates a path information table for mobile service that is generated at path information block (120) in FIG. 46 by the steps of flow diagram FIG. 8. The input for the flow at S1302 is integrated unicast routing table shown in FIG. 52. The flow at S1303 extracts list of each item in FIG. 52. The input of the flow at S1304 is target path information table shown in FIG. 54. The flow at S1305 extracts the list of each item. The flow at S1306 makes a loop for each endpoint, i.e. source 2001:db8::10, destination 2001:db8::11 and related equipment 2001:db8::1, 2001:db8::3, 2001:db8::4. The flow at S1307 provides equipment neighboring above each endpoint, i.e. S/P GW, eNB and router2 for each based on items #7, #18 and #1-#3 in FIG. 52. The flow at S1308 makes loop for each pair of endpoints, i.e. (2001:db8::10, 2001:db8::11) related to data plane i.e. stream data transmission, and (2001:db8::3, 2001:db8::1), (2001:db8::4, 2001:db8::3) and (2001:db8::11, 2001:db8::10) related to control plane i.e. connection/session/service management. When the pair of endpoints is (2001:db8::10, 2001:db8::11), the initial current equipment neighboring the endpoint 2001:db8::10 is S/P GW and the flow at S1309 looks for the route toward the other endpoint 2001:db8::11 and finds item #8 in FIG. 52. The flow at S1310 set router2 as next current equipment though IP of the other endpoint is 2001:db8::4 because item #8 in FIG. 52 indicates tunneled interface. The flow at S1309 for the second time finds item #3 in FIG. 52 and the flow at S1310 set eNB as next current equipment. The flow at S1309 for the third time finds item #18 that indicates the other endpoint 2001:db8::11 is neighboring eNB and there is no next equipment. This flow diagram generates a part of path1, i.e. items #1, #2 and #3, in FIG. 55. In the same way, other parts of path1 in FIG. 55 are generated.

FIG. 56 illustrates a data plane packet information table generated at data plane information generating part 131a1 in FIG. 6 by selecting data plane packet information, e.g. MPEG stream, from FIG. 53. This table corresponds to the flow at S1403 in FIG. 9. Similar tables for generating and utilizing a data plane and path matching table, control plane and path matching table, data plane and path matching table, and control plane and path matching table can be implemented as in FIGS. 18-21 can be utilized for facilitating the desired mobile service implementation.

Figure 57:
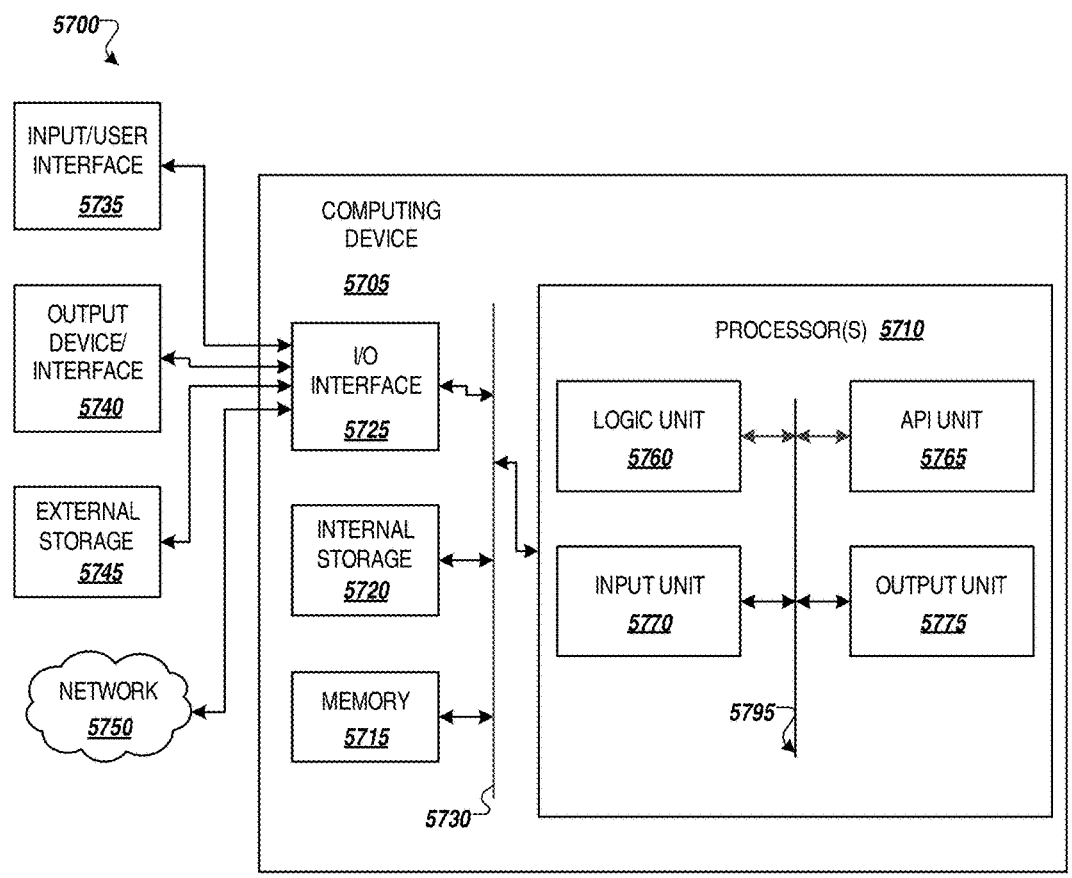
FIG. 57 illustrates an example computing environment upon which example implementations may be applied.

FIG. 57 illustrates an example computing environment with an example computer device suitable for use in some example implementations, such as an apparatus to facilitate the functionality of navigating another movable apparatus. Computer device 5705 in computing environment 5700 can include one or more processing units, cores, or processors 5710, memory 5715 (e.g., RAM, ROM, and/or the like), internal storage 5720 (e.g., magnetic, optical, solid state storage, and/or organic), and/or I/O interface 5725, any of which can be coupled on a communication mechanism or bus 5730 for communicating information or embedded in the computer device 5705.

Computer device 5705 can be communicatively coupled to input/user interface 5735 and output device/interface 5740. Either one or both of input/user interface 5735 and output device/interface 5740 can be a wired or wireless interface and can be detachable. Input/user interface 5735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 5740 may include a display, television, monitor, printer, speaker, braille, or the like. In some example implementations, input/user interface 5735 and output device/interface 5740 can be embedded with or physically coupled to the computer device 5705. In other example implementations, other computer devices may function as or provide the functions of input/user interface 5735 and output device/interface 5740 for a computer device 5705.

Examples of computer device 5705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 5705 can be communicatively coupled (e.g., via I/O interface 5725) to external storage 5745 and network 5750 for communicating with any number of networked components, devices, and systems, including one or more computer devices of the same or different configuration. Computer device 5705 or any connected computer device can be functioning as, providing services of, or referred to as a server, client, thin server, general machine, special-purpose machine, or another label.

I/O interface 5725 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 5700. Network 5750 can be any network or combination of networks (e.g., the Internet, local area network, wide area network, a telephonic network, a cellular network, satellite network, and the like).

Computer device 5705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 5705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Computer device 5705 can be configured to implement the architecture as illustrated for example, in FIGS. 2, 5, 6 and 46, and can be facilitated to execute the flow diagrams as illustrated in FIGS. 7-10. Memory 5715 can be configured to store management information as illustrated in the tables (e.g., FIGS. 15-29), to facilitate the execution of the flow diagrams.

In example implementations, computer device 5705 can be in the form of a management computer configured to manage a network as illustrated, for example, in FIGS. 2, 5, 6 and 46. In such an example implementation, memory 5715 can be configured to store anomaly criteria information for the network and path information for the network as illustrated in FIGS. 20-23. Processor(s) 5710 may be configured to apply the path information to at least one of data plane packet information and control plane packet information to generate matching information, the matching information involving first entries from at least one of the data plane packet information and control plane packet information having sources matched to corresponding second entries from the path information having paths corresponding to the sources as described with respect to FIGS. 17-24 with respect to the flow diagrams of FIGS. 6 to 10 and monitor the network for an anomaly based on the matching information and the anomaly criteria information.

The path information can include incoming interface information and outgoing interface information for each router in each of the paths, wherein the control plane packet information can include incoming control plane packet information and outgoing control plane packet information for each interface of each router. Processor(s) 5710 can be configured to generate the matching information by matching first information from the path information, the first information involving the incoming interface information and the outgoing interface information for each of the paths, to second information from the control plane packet information, the second information comprising the incoming control plane packet information and the outgoing control plane packet information associated with an interface that matches an interface indicated by the incoming interface information and the outgoing interface information. Similarly, processor(s) 5710 can be configured to match first information from the path information, the first information including the incoming interface information and the outgoing interface information for each of the paths, to second information from the data plane packet information, the second information including the incoming data plane packet information and the outgoing data plane packet information associated with an interface that matches an interface indicated by the incoming interface information and the outgoing interface information.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A management computer configured to manage a network, the management computer comprising:
   a memory, configured to store anomaly criteria information for the network and path information for the network;
   a processor, configured to:
   apply the path information to at least one of data plane packet information and control plane packet information to generate matching information, the matching information comprising first entries from at least one of the data plane packet information and control plane packet information matched to corresponding second entries from the path information having paths, the data plane packet information and the control plane packet information include information of packet transferred on the paths; and
   monitor the network for an anomaly based on the matching information and the anomaly criteria information;
   wherein the processor is configured to determine the path information by:
       determining multicast group and source pairs of the network;
       determining upstream routers associated with each of the multicast group and source pairs;
       determining paths based on the upstream routers; and
       determining connections to the paths from a connecting point.

2. The management computer of claim 1, wherein the path information comprises incoming interface information and outgoing interface information for each router in each of the paths, wherein the control plane packet information comprises incoming data plane packet information and outgoing data plane packet information for each interface of each router, wherein the processor is configured to generate the matching information by:
   matching first information from the path information, the first information comprising the incoming interface information and the outgoing interface information for each of the paths, to second information from the data plane packet information, the second information comprising the incoming data plane packet information and the outgoing data plane packet information associated with an interface that matches an interface indicated by the incoming interface information and the outgoing interface information.

3. The management computer of claim 1, wherein the path information comprises incoming interface information and outgoing interface information for each router in each of the paths, wherein the control plane packet information comprises incoming control plane packet information and outgoing control plane packet information for each interface of each router, wherein the processor is configured to generate the matching information by:
matching first information from the path information, the first information comprising the incoming interface information and the outgoing interface information for each of the paths, to second information from the control plane packet information, the second information comprising the incoming control plane packet information and the outgoing control plane packet information associated with an interface that matches an interface indicated by the incoming interface information and the outgoing interface information.

4. The management computer of claim 1, wherein the processor is configured to determine the path information by:
determining one or more possible routes from each router in the network;
determining endpoints of service for the network;
determining neighboring routers in the network for each of the endpoints of service; and
determining connections between the neighboring routers based on the one or more possible routes.

5. The management computer of claim 1, wherein the anomaly criteria comprises at least one of: link utilization ratio, and a number of a type of message across a plurality of message cycles based on robustness count;
wherein the processor is configured to monitor the network for an anomaly by:
comparing an entry from the matching information to the anomaly criteria; and
for the anomaly criteria not being met, raise an alert.

6. The management computer of claim 1, wherein the processor is configured to:
determine an addition or a deletion of endpoints of service of the network from service request packets associated with the endpoints of service and route changes associated with the endpoints of service; and
determine the path information by:
determining one or more possible routes from each router in the network;
determining endpoints of service for the network;
determining neighboring routers in the network for each of the endpoints of service; and
determining connections between the neighboring routers based on the one or more possible routes.

7. The management computer of claim 1, wherein the processor is configured to:
determine an addition or a deletion of endpoints of service of the network from service request packets indicative of the endpoints of service and route changes having endpoints of service;
determine the path information by:
determining one or more possible routes from each router and mobile network equipment in the network;
determining endpoints of service for the network;
determining neighboring routers and mobile network equipment in the network for each of the endpoints of service; and
determining connections between the neighboring routers and mobile network equipment based on the one or more possible routes.

8. A non-transitory computer readable medium, storing instructions for executing a process for a network, the instructions comprising:
managing anomaly criteria information for the network and path information for the network;
applying the path information to at least one of data plane packet information and control plane packet information to generate matching information, the matching information comprising first entries from at least one of the data plane packet information and control plane packet information having sources matched to corresponding second entries from the path information having paths corresponding to the sources; and
monitoring the network for an anomaly based on the matching information and the anomaly criteria information;
wherein the determining the path information comprises:
determining multicast group and source pairs of the network;
determining upstream routers associated with each of the multicast group and source pairs;
determining paths based on the upstream routers; and
determining connections to the paths from a connecting point.

9. The non-transitory computer readable medium of claim 8, wherein determining the path information comprises:
determining one or more possible routes from each router in the network;
determining endpoints of service for the network;
determining neighboring routers in the network for each of the endpoints of service; and
determining connections between the neighboring routers based on the one or more possible routes.

10. The non-transitory computer readable medium of claim 8, wherein the anomaly criteria comprises at least one of: link utilization ratio, and a number of a type of message across a plurality of message cycles based on robustness count;
wherein the monitoring the network for an anomaly comprises:
comparing an entry from the matching information to the anomaly criteria; and
for the anomaly criteria not being met, raise an alert.

11. The non-transitory computer readable medium of claim 8, the instructions further comprising:
determining an addition or a deletion of endpoints of service of the network from service request packets associated with the endpoints of service and route changes associated with the endpoints of service; and
wherein the determining the path information comprises:
determining one or more possible routes from each router in the network;
determining endpoints of service for the network;
determining neighboring routers in the network for each of the endpoints of service; and
determining connections between the neighboring routers based on the one or more possible routes.

12. The non-transitory computer readable medium of claim 8, the instructions further comprising:
determine an addition or a deletion of endpoints of service of the network from service request packets indicative of the endpoints of service and route changes having endpoints of service;
wherein determining the path information comprises:

determining one or more possible routes from each router and mobile network equipment in the network;

determining endpoints of service for the network;

determining neighboring routers and mobile network equipment in the network for each of the endpoints of service; and determining connections between the neighboring routers and mobile network equipment based on the one or more possible routes.

* * * * *